(12) United States Patent
Elliott et al.

(10) Patent No.: US 11,531,800 B2
(45) Date of Patent: Dec. 20, 2022

(54) VERIFICATION OF HARDWARE DESIGN FOR COMPONENT THAT EVALUATES AN ALGEBRAIC EXPRESSION USING DECOMPOSITION AND RECOMBINATION

(71) Applicant: Imagination Technologies Limited, Kings Langley (GB)

(72) Inventors: Sam Elliott, London (GB); Rachel Edmonds, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/501,219

(22) Filed: Oct. 14, 2021

(65) Prior Publication Data

US 2022/0114315 A1 Apr. 14, 2022

(30) Foreign Application Priority Data

Oct. 14, 2020 (GB) ..................................... 2016320

(51) Int. Cl.
  *G06F 30/3323* (2020.01)
  *G06F 30/392* (2020.01)
  *G06F 111/04* (2020.01)

(52) U.S. Cl.
  CPC ........ *G06F 30/3323* (2020.01); *G06F 30/392* (2020.01); *G06F 2111/04* (2020.01)

(58) Field of Classification Search
  USPC .......................................................... 716/106
  See application file for complete search history.

(56) References Cited

U.S. PATENT DOCUMENTS

| 8,352,505 B1* | 1/2013 | Venkataramani | ....... G06F 30/30 707/769 |
| 2006/0085782 A1* | 4/2006 | Ward | ..................... G06F 30/30 716/106 |

(Continued)

FOREIGN PATENT DOCUMENTS

| EP | 3239834 A1 | 11/2017 |
| GB | 2583333 A | 10/2020 |

OTHER PUBLICATIONS

Harrison; "Floating Point Verification in HOL Light: The Exponential Function"; vol. 1349; pp. 246-260.

(Continued)

*Primary Examiner* — Mohammed Alam
(74) *Attorney, Agent, or Firm* — Potomac Law Group, PLLC; Vincent M DeLuca

(57) ABSTRACT

Methods and systems for verifying a hardware design for a component that evaluates a main algebraic expression comprising at least two variables wherein the main algebraic expression is representable as a lossless combination of a plurality of sub-algebraic expressions, and one or more of the at least two variables can be constrained to cause an instantiation of the hardware design to evaluate each of the sub-algebraic expressions. The methods include: for each of the plurality of sub-algebraic expressions, verifying that an instantiation of the hardware design generates a correct output to that sub-algebraic expression for valid values of each variable in that sub-algebraic expression; and for each of one or more combinations of sub-algebraic expressions, formally verifying that an instantiation of the hardware design generates a correct output to that combination by comparing an output of an instantiation of the hardware design under a first set of constraints to an output of an instantiation of the hardware design under a second set of (Continued)

constraints; wherein the one or more combinations comprises a combination that is equivalent to the main algebraic expression.

20 Claims, 6 Drawing Sheets

(56) References Cited

U.S. PATENT DOCUMENTS

2013/0198705 A1   8/2013   Janssen et al.
2022/0114315 A1*  4/2022   Elliott ................. G06F 30/3323

OTHER PUBLICATIONS

Shekhar et al; "Simulation Bounds for Equivalence Verification of Polynomial Datapaths Using Finite Ring Algebra"; IEEE Transactions On Very Large Scale Integration (VLSI) Systems; vol. 16; No. 4; Apr. 2008.

* cited by examiner

VERIFICATION OF HARDWARE DESIGN FOR COMPONENT THAT EVALUATES AN ALGEBRAIC EXPRESSION USING DECOMPOSITION AND RECOMBINATION

BACKGROUND

Many electronic devices, such as systems-on-chips (SoCs), include a hardware component (e.g. an integrated circuit) that evaluates an arithmetic expression. In mathematics an expression is a finite combination of mathematical symbols. Mathematical symbols include constants, variables, operations, functions etc. An algebraic expression is an expression formed of constants, variables and algebraic operations (e.g. addition, subtraction, multiplication, division and exponentiation by an exponent that is a rational number). For example, 5x+8 is an algebraic expression as it is formed of constants (5, 8), variables (x) and algebraic operations (multiplication and addition). An algebraic expression is evaluated by replacing each variable of the expression with a value and performing the algebraic operations.

A hardware component that is configured to evaluate an algebraic expression is configured to receive an input value for each variable in the algebraic expression, calculate the value of the expression using those value(s), and output the calculated value. For example, a component configured to evaluate the algebraic expression 5x+8 is configured to receive a value for x, calculate the value of the expression for the received value of x, and output the calculated value.

Generating a hardware component that evaluates an algebraic expression typically includes developing a hardware design that describes the structure and/or function of an integrated circuit that evaluates the algebraic expression; verifying or testing the hardware design to ensure that an integrated circuit manufactured according to the design will behave as expected; and once verified, manufacturing an integrated circuit, at an integrated circuit manufacturing system, in accordance with the hardware design.

In some cases, verifying the hardware design for a component that evaluates an algebraic expression may comprise verifying that an instantiation of the hardware design will generate the correct output, according to the algebraic expression, for any valid input(s).

A hardware design may be verified, for example, by formal verification or simulation-based verification. Formal verification is a systematic process that uses a mathematical model of the hardware design and mathematical reasoning to verify the hardware design. In contrast, simulation-based verification is a process in which a hardware design is tested by applying stimuli to an instantiation of the hardware design and monitoring the output of the instantiation of the hardware design in response to the stimuli.

In formal verification, the hardware design is transformed into a mathematical model (e.g. a state-transition system, or a flow graph) to thereby provide an instantiation of the hardware design which can be tested to verify the hardware design, and formal properties to be verified are expressed using mathematical logic using a precise syntax or a language with a precise mathematical syntax and semantics.

Formal verification is performed using a formal verification tool (i.e. a software tool that is capable of performing formal verification of a hardware design). Formal verification tools include, but are not limited to, formal property checkers such as OneSpin 360 DV™, Mentor Graphics Questa® Formal Verification, Synopsys® VC Formal, Cadence® Incisive® Enterprise Verifier, and JasperGold®; and formal equivalence checkers (which may also be referred to as formal model checkers) such as Synopsys® HECTOR, and other logical equivalence checkers (LECs) and sequential logical equivalence checkers (SLECs).

Formal verification can improve controllability as compared to simulation-based verification. Low controllability occurs when the number of simulation test signals or vectors required to thoroughly simulate a hardware design becomes unmanageable. For example, a 32-bit comparator requires $2^{64}$ test vectors. This may take millions of years to verify exhaustively by simulation-based verification. By performing formal verification, the 32-bit comparator can be verified in less than a minute.

While formal verification can be an effective method for exhaustively verifying properties of a hardware design, this is only true if the properties that are to be verified are presented in such a manner that a formal verification tool can solve the problem presented thereby. Specifically, during formal verification of a hardware design the hardware design is represented as a mathematical model, the properties to be proved are also represented mathematically, and mathematical reasoning is used to determine if the properties are true for the hardware design based on the mathematical model. In other words, in formal verification the verification is presented as a mathematical problem to be solved. Some mathematical problems will be solvable within a reasonable amount of time by a formal verification tool whereas others will not. When a formal verification tool is able to solve the mathematical problem presented by the hardware design and the properties to be verified then the formal verification is said to converge. When, however, a formal verification tool is unable to solve the mathematical problem presented by the hardware design and the properties to be verified, then the formal verification does not converge, and no results are output, and the verification is inconclusive.

A naïve method to verify a hardware design for a component that evaluates an algebraic expression is to explicitly verify that an instantiation of the hardware design generates the correct output for each valid value of each variable of the algebraic expression by, verifying (e.g. via formal verification) that the output of an instantiation of the hardware design matches the output of a high-level model of the hardware design when they receive the same inputs. However, where the algebraic expression has a lot of input variables and/or input variables with a large bit width, this naïve verification method suffers from scaling issues. An example of such an algebraic expression is an algebraic expression of a dot product of two n-element vectors $a=\{a_0, a_1, \ldots, a_{n-1}\}$ and $b=\{b_0, b_1, \ldots, b_{n-1}\}$, —i.e. $a_0 b_0 + a_1 b_1 + \ldots + a_{n-1} b_{n-1}$—where n is large (e.g. 64 or 128). Furthermore, the more complex the algebraic expression, the more differences are likely to arise between how the hardware design evaluates the expression and how a high-level model of the hardware design evaluates the algebraic expression, which makes it harder for a formal verification tool to compare the hardware design to the model, and thus harder for the verification to converge.

The embodiments described below are provided by way of example only and are not limiting of implementations which solve any or all of the disadvantages of known methods and systems for verifying a hardware design for a component that evaluates an algebraic expression.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for verifying a hardware design for a component that evaluates a main algebraic expression comprising at least two variables, wherein the main algebraic expression is representable as a lossless combination of a plurality of sub-algebraic expressions, and one or more of the at least two variables can be constrained to cause an instantiation of the hardware design to evaluate each of the sub-algebraic expressions. The methods include: for each of the plurality of sub-algebraic expressions, verifying that an instantiation of the hardware design generates a correct output to that sub-algebraic expression for valid values of each variable in that sub-algebraic expression; and for each of one or more combinations of sub-algebraic expressions, formally verifying that an instantiation of the hardware design generates a correct output to that combination by comparing an output of an instantiation of the hardware design under a first set of constraints to an output of an instantiation of the hardware design under a second set of constraints; wherein the one or more combinations comprises a combination that is equivalent to the main algebraic expression.

A first aspect provides a computer-implemented method of verifying a hardware design for a component that evaluates a main algebraic expression comprising at least two variables, the main algebraic expression being representable as a lossless combination of a plurality of sub-algebraic expressions, and one or more of the at least two variables can be constrained to cause an instantiation of the hardware design to evaluate each of the sub-algebraic expressions, the method comprising, at one or more processors: for each of the plurality of sub-algebraic expressions, verifying that an instantiation of the hardware design generates a correct output to that sub-algebraic expression for valid values of each variable in that sub-algebraic expression; and for each of one or more combinations of sub-algebraic expressions, formally verifying that an instantiation of the hardware design generates a correct output to that combination by comparing an output of an instantiation of the hardware design under a first set of constraints to an output of an instantiation of the hardware design under a second set of constraints; wherein the one or more combinations comprises a combination that is equivalent to the main algebraic expression.

Verifying that an instantiation of the hardware design generates a correct output to a certain sub-algebraic expression of the plurality of sub-algebraic expressions may comprise, for each valid value of each variable in the certain sub-algebraic expression: determining a first output of an instantiation of the hardware design constrained to evaluate the certain sub-algebraic expression; determining a second output of a high-level model of the hardware design constrained to evaluate the certain sub-algebraic expression and constrained to use the same values for the variables of the certain sub-algebraic expression that were used to generate the first output; and verifying that the first output matches the second output.

A specific sub-algebraic expression of the plurality of sub-algebraic expressions may be polynomial of degree k in a variable x for all values of x in a set of values of x, and verifying that an instantiation of the hardware design generates a correct output to the specific sub-algebraic expression may comprise: formally verifying that an instantiation of the hardware design constrained to evaluate the specific sub-algebraic expression implements an expression that is polynomial of degree k in x by formally verifying that, for all values of x in the set of values of x, an instantiation of the hardware design has a constant $k^{th}$ difference; and verifying that an instantiation of the hardware design constrained to implement the specific sub-algebraic expression generates an expected output in response to each of at least e different values of x in the set of values of x, wherein e is equal to k when a value of the $k^{th}$ difference is predetermined and e is equal to k+1 when the value of the $k^{th}$ difference is not predetermined.

The main algebraic expression may be permutation invariant with respect to a particular sub-algebraic expression and a particular verified algebraic expression, and verifying that an instantiation of the hardware design generates a correct output to the particular sub-algebraic expression may comprise, for all valid values of the variables of the particular verified algebraic expression: determining a first output of an instantiation of the hardware design constrained to evaluate the particular verified algebraic expression; determining a second output of an instantiation of the hardware design constrained to evaluate the particular sub-algebraic expression when the values of the variables of the particular sub-algebraic expression are the same as the values of the variables of the particular verified algebraic expression used to generate the first output; and verifying that the first output matches the second output.

Each combination may be a combination of a first verified algebraic expression and a second verified algebraic expression, and each of the first and second verified algebraic expressions may be one of: a verified sub-algebraic expression and a verified combination.

Formally verifying that an instantiation of the hardware design generates a correct output to a specific combination of the one or more combinations may comprise, for valid values of each variable of the first verified algebraic expression and the second verified algebraic expression of the specific combination: determining a first output of an instantiation of the hardware design constrained to evaluate the first verified algebraic expression; determining a second output of an instantiation of the hardware design constrained to evaluate the second verified algebraic expression; determining a third output of an instantiation of the hardware design constrained to evaluate the specific combination, wherein the variables of the first verified algebraic expression have the same values as the variables of the first verified algebraic expression used to generate the first output, and the variables of the second verified algebraic expression have the same values as the variables of the second verified algebraic expression used to generate the second output; and verifying that the third output matches the combination of the first and second outputs.

A particular combination of the one or more combinations may combine the first verified algebraic expression and the second verified algebraic expression through an addition operation, and formally verifying that an instantiation of the hardware design generates a correct output to the particular combination may comprise: formally verifying that an instantiation of the hardware design constrained to evaluate the particular combination implements an expression that is polynomial of degree k in the first verified algebraic expression by formally verifying that, for all values of the first verified algebraic expression, an instantiation of the hardware design has a constant $k^{th}$ difference; and verifying that an instantiation of the hardware design constrained to implement the particular combination generates an expected output in response to each of at least e different values of the first verified algebraic expression, wherein e is equal to k when a value of the $k^{th}$ difference is predetermined and e is equal to k+1 when the value of the $k^{th}$ difference is not predetermined.

Formally verifying that, for all values of the first verified algebraic expression, an instantiation of the hardware design has a constant $k^{th}$ difference may comprise, during the formal verification, identifying values of the variables of the first verified algebraic expression that result in consecutive values of the first verified algebraic expression, and comparing outputs of an instantiation of the hardware design in response to values of the variables of the first verified algebraic expression that result in consecutive values of the first verified algebraic expression.

Identifying values of the variables of the first verified algebraic expression that result in consecutive values of the first verified algebraic expression may comprise: determining a first output of an instantiation of the hardware design constrained to evaluate the first verified algebraic expression; determining a second output of an instantiation of the hardware design constrained to evaluate the first verified algebraic expression when the second output is constrained to be greater than the first output by a predetermined number; and identifying the values of the variables of the first verified algebraic expression used to generate the first output and the values of the variables of the first verified algebraic expression used to generate the second output as values of the variables of the first verified algebraic expression that result in consecutive values of the first verified algebraic expression.

During the formal verification the formal verification tool may select values of the variables of the first verified algebraic expression which cause the second output to be greater than the first output by the predetermined number.

Comparing outputs of an instantiation of the hardware design in response to values of the variables of the first verified algebraic expression that result in consecutive values of the first verified algebraic expression may comprise: determining a third output of an instantiation of the hardware design constrained to evaluate the particular combination when the values of the variables of the first verified algebraic expression match the values of the variables of the first verified algebraic expression used to generate the first output; determining a fourth output of an instantiation of the hardware design constrained to evaluate the particular combination when the values of the variables of the first verified algebraic expression match the values of the variables of the first verified algebraic expression used to generate the second output, and the values of any other variables to the combination match the values of those other variables used to generate the third output; and comparing the third output and the fourth output.

One or more of the first, second and third outputs may be generated from different copies of the hardware design.

One or more of the first, second and third outputs may be generated in a different cycle of a same copy of the hardware design.

The output of the first verified algebraic expression may be a multiple bit binary number, and formally verifying that, for all values of the first verified algebraic expression, an instantiation of the hardware design has a constant $k^{th}$ difference may comprise verifying the constant $k^{th}$ difference separately for each bit of the output of the first verified algebraic expression.

The output of the first verified algebraic expression may be a multiple bit binary number; k may be equal to one; the constant $k^{th}$ difference may be c; and formally verifying that, for all values of the first verified algebraic expression, an instantiation of the hardware design has a constant $k^{th}$ difference may comprise formally verifying for each bit i of the output of the first verified algebraic expression that the difference in the outputs of an instantiation of the hardware design in response to a first value of the first verified algebraic expression and a second value of the first verified algebraic expression is equal to $2^{i}*c$ wherein the $i^{th}$ least significant bit of the first value is one and the $i^{th}$ least significant bit of the second value is zero and all other bits of the first value and the second value are the same.

A first combination of the one or more combinations may combine first and second verified sub-algebraic expressions, and each combination of the one or more combinations thereafter may combine a single verified sub-algebraic expression with a most recently verified combination.

The one or more combinations may comprise a hierarchical set of combinations of the sub-algebraic expressions.

Each sub-algebraic expression of the plurality of sub-algebraic expressions may comprise a single algebraic operation.

At least one sub-algebraic expression of the plurality of sub-algebraic expressions may comprise multiple algebraic operations.

The method may further comprise, in response to determining that at least one of the verifications was not successful, modifying the hardware design to generate a modified hardware design.

The method may further comprise repeating the verifications for the modified hardware design.

The method may further comprise, in response to determining that the verifications were successful, manufacturing, using an integrated circuit manufacturing system, an integrated circuit embodying the component according to the hardware design.

When processed in an integrated circuit manufacturing system, the hardware design may configure the integrated circuit manufacturing system to manufacture an integrated circuit embodying the component.

The method may further comprise, in response to determining that the verifications were successful, storing or encoding on a computer readable medium the verified hardware design that, when processed in an integrated circuit manufacturing system, causes the integrated circuit manufacturing system to manufacture an integrated circuit embodying the component.

A second aspect provides a system for verifying a hardware design for a component that evaluates a main algebraic expression comprising at least two variables, the main algebraic expression being representable as a lossless combination of a plurality of sub-algebraic expressions, and one or more of the at least two variables can be constrained to cause an instantiation of the hardware design to evaluate each of the sub-algebraic expressions, the system comprising: memory configured to store: the hardware design; one or more verification tools comprising one or more formal verification tools; and one or more processors configured to: for each of the plurality of sub-algebraic expressions, verify, using the one or more verification tools, that an instantiation of the hardware design generates a correct output to that sub-algebraic expression for valid values of each variable in that sub-algebraic expression; and for each of one of more combinations of sub-algebraic expressions, formally verify, using the one or more formal verification tools, that an instantiation of the hardware design generates a correct output to that combination of sub-algebraic expressions by comparing an output of an instantiation of the hardware design under a first set of constraints to an output of an instantiation of the hardware design under a second set of constraints; wherein the one or more combinations comprises a combination that is equivalent to the main algebraic expression.

A hardware design for a component that evaluates an algebraic expression, when processed in an integrated circuit manufacturing system, configures the system to manufacture an integrated circuit embodying the component. There may be provided a non-transitory computer readable storage medium having stored thereon a hardware design for a component that evaluates an algebraic expression, which, when processed in an integrated circuit manufacturing system, causes the integrated circuit manufacturing system to manufacture an integrated circuit embodying the component.

There may be provided an integrated circuit manufacturing system comprising: a non-transitory computer readable storage medium having stored thereon a hardware design for a component that evaluates an algebraic expression; a layout processing system configured to process the computer readable description so as to generate a circuit layout description of an integrated circuit embodying the component; and an integrated circuit generation system configured to manufacture an integrated circuit embodying the component according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
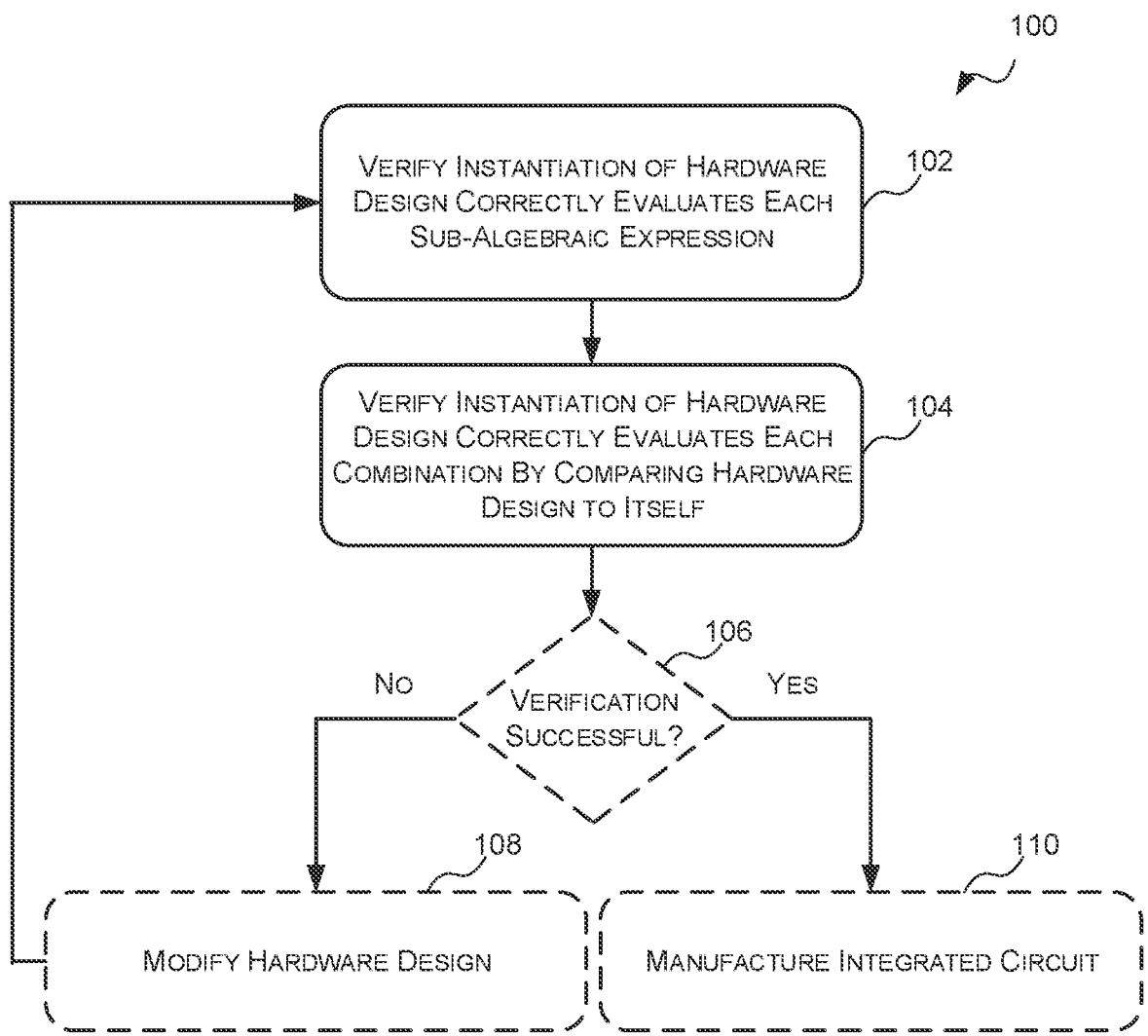
FIG. 1 is a flow diagram of an example method of verifying a hardware design for a component that evaluates an algebraic expression.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

A "hardware design" is a description of the structure and/or function of an integrated circuit, which, when processed at an integrated circuit manufacturing system, causes the integrated circuit manufacturing system to generate an integrated circuit described by the hardware design. For example, as described in more detail below with respect to FIG. 6, when a hardware design is processed at an integrated circuit manufacturing system the integrated circuit manufacturing system may generate the integrated circuit by synthesizing the hardware design into silicon, or, by loading configuration data into a field-programmable gate array (FPGA).

A hardware design may be implemented in a high-level hardware description language (HDL), such as, but not limited to, a register transfer level (RTL) language. Examples of register transfer level languages include, but are not limited to, VHDL (VHSIC Hardware Description Language) and Verilog®. It will be evident to a person of skill in the art that other high-level hardware description languages may be used such as proprietary high-level hardware description languages.

An "instantiation of a hardware design" is a representation of the hardware and/or functionality of the hardware defined by the hardware design. An instantiation of a hardware design includes, but is not limited to, an emulation model of the hardware design that mimics or reproduces the behaviour of the hardware defined by the hardware design, a synthesized version (e.g. netlist) of the hardware design, a hardware implementation (e.g. integrated circuit or a field-programmable gate array (FPGA)) of the hardware design, and a mathematical model of the hardware design generated by a formal verification tool. An instantiation of the hardware design embodies the hardware design in a form which can be tested to verify the hardware design.

A hardware design for a component that evaluates an algebraic expression is thus a description of the structure and/or function of an integrated circuit to implement a component that is configured to receive an input for each variable of the algebraic expression specifying the value of that variable, calculate the value of the algebraic expression based on the received variable values, and output the calculated value, which, when processed at an integrated circuit manufacturing system causes the integrated circuit manufacturing system to generate an integrated circuit that embodies the component.

As described above, a naïve way to verify a hardware design for a component that evaluates an algebraic expression is to explicitly verify that an instantiation of the hardware design generates the correct output for each valid value of each variable by, verifying (e.g. via formal verification) that the output of an instantiation of the hardware design matches the output of a high-level model of the hardware design when they receive the same inputs. However, where the algebraic expression has a lot of input variables and/or input variables with a large bit width, this naïve verification suffers from scaling issues. An example of such an algebraic expression is an algebraic expression of a dot product of two n-element vectors $a=\{a_0, a_1, \ldots, a_{n-1}\}$ and $b=\{b_0, b_1, \ldots, b_{n-1}\}$, —i.e. $a_0b_0+a_1b_1+ \ldots +a_{n-1}b_{n-1}$—where n is large (e.g. 64 or 128). Furthermore, the more complex the algebraic expression, the more differences are likely to arise between how the hardware design evaluates the expression and how a high-level model of the hardware design evaluates the algebraic expression, which makes it harder for a formal verification tool to compare the hardware design to the model, and thus harder for the verification to converge.

The inventors have identified that if the algebraic expression evaluated by a component can be described as a lossless combination of a plurality sub-algebraic expressions, and the inputs of an instantiation of the hardware design can be constrained to cause the hardware design to evaluate each sub-algebraic expression, then the hardware design can be efficiently verified by (i) verifying that the hardware design correctly evaluates each of the sub-algebraic expressions; and then (ii) formally verifying that the hardware design correctly evaluates combinations of the sub-algebraic expressions until a combination that is equivalent to the algebraic expression is verified. Accordingly, the methods described herein may be referred to as decomposition and recombination methods, as the algebraic expression is decomposed into a combination of simpler algebraic expressions which are verified and then the verified simpler algebraic expressions are recombined and verified.

In the examples described herein, each combination combines two previously verified algebraic expressions M and N, wherein each of M and N are either a verified sub-algebraic expression or a previously verified combination. Each combination is verified by comparing an output of an instantiation of the hardware design under a set of constraints to an output of an instantiation of the hardware design under one or more other sets of constraints. For example, each combination may be verified by comparing an instantiation of the hardware design constrained to evaluate the combination of M and N, to instantiations of the hardware design constrained to evaluate M and N individually. Verifying the combinations by comparing instantiations of the same design under different constraints leverages the self-similarity of the designs and significantly increases the chances that the formal verification will converge.

For example, if a hardware design is for a component that evaluates the algebraic expression $a_0a_1+a_2a_3$, where $a_0$, $a_1$, $a_2$, $a_3$ are variables, then the algebraic expression may be represented as a combination of sub-algebraic expressions $a_0a_1$ and $a_2a_3$. Then it may be verified that an instantiation of the hardware design correctly evaluates $a_0a_1$, and it may be verified that an instantiation the hardware design correctly evaluates $a_2a_3$. Then it may be verified that an instantiation of the hardware design correctly evaluates the combination $a_0a_1+a_2a_3$ by comparing an instantiation of the hardware design constrained to evaluate $a_0a_1+a_2a_3$ to instantiations of the hardware design constrained to evaluate $a_0a_1$ and $a_2a_3$ individually. Details of how this may be implemented, and possible optimizations thereof, are described below.

Although it has been found that the example verification methods and systems described herein work particularly well for hardware designs for components that evaluate an algebraic expression with a large number (e.g. 64 or 128) of input variables and/or with input variables with a large bit width (e.g. 64 or 128), the methods and systems described herein may be used to verify any hardware component that evaluates an algebraic expression that can be expressed as a lossless combination of sub-algebraic expressions, and the inputs to an instantiation of the hardware design can be constrained so as to cause the instantiation of the hardware design to evaluate any of the sub-algebraic expressions.

Reference is now made to FIG. 1 which illustrates an example method 100 for verifying a hardware design for a component that evaluates a main algebraic expression. The method 100 may be implemented by a computing-based device such as, but not limited to, the computing-based device 400 described below with respect to FIG. 4. For example, there may be a computer readable storage medium having stored thereon computer readable instructions that, when executed at a computing-based device, cause the computing-based device to perform the method 100 of FIG. 1.

In the examples described herein the main algebraic expression can be represented by, or described as, a lossless combination of sub-algebraic expressions, wherein it is possible to cause an instantiation of the hardware design to generate the output of each sub-algebraic algebraic expression (i.e. it is possible to cause an instantiation of the hardware design to evaluate each sub-algebraic expression). As described above, an algebraic expression is a mathematical expression comprising a combination of constants, variables and algebraic operations. Accordingly, by definition each sub-algebraic expression comprises at least one variable.

A combination of sub-algebraic expressions is said to be lossless if the result of the combination operation is the actual result (i.e. there is no rounding). For integer variables, a division operation is not lossless in general, thus combining two sub-algebraic expressions via a division operation is not lossless. However, combining sub-algebraic expressions via an addition, subtraction or multiplication operation can be performed losslessly.

For example, if the main algebraic expression X represents a dot product of two n-element vectors of integer variables $a=\{a_0, a_1, \ldots, a_{n-1}\}$, $b=\{b_0, b_1, \ldots, b_{n-1}\}$, where n is an integer greater than or equal to 2, i.e. $X=a_0b_0+a_1b_1+ \ldots +a_{n-1}b_{n-1}$, the main algebraic expression X can be represented as a combination (i.e. addition) of the following sub-algebraic expressions: $a_0b_0, a_1b_1, \ldots, a_{n-1}b_{n-1}$.

In this example, each of the sub-algebraic expressions comprises a single algebraic operation (i.e. a multiplication), however, in other examples, one or more of the sub-algebraic expressions may comprise multiple algebraic operations. In other words, the sub-algebraic expressions do not have to represent the lowest level terms of the main algebraic expression. For example, instead of describing the dot product X as a combination of the following sub-algebraic expressions: $a_0b_0, a_1b_1, \ldots, a_{n-1}b_{n-1}$, the dot product X may alternatively be described as a combination of the following sub-algebraic expressions: $a_0b_0+a_1b_1, \ldots a_{n-2}b_{n-2}+a_{n-1}b_{n-1}$; or $a_0b_0, a_1b_1+a_2b_2, \ldots, a_{n-3}b_{n-3}, a_{n-2}b_{n-2}+a_{n-1}b_{n-1}$. The more combination operations that are in each sub-algebraic expression, the fewer sub-algebraic expressions there are and thus the fewer sub-algebraic verifications and combination verifications are to be performed. However, the more complex the sub-algebraic expressions, the more complicated the verifications become. Accordingly, one may have to balance the complexity of the verifications with the number of verifications. It will be evident to a person of skill in the art that these are examples only, and there are numerous other ways in which the dot product X can be represented as a combination of sub-algebraic expressions.

Similarly, in the dot product X example, all of the combination operations are the same (i.e. all of the sub-algebraic expressions are combined by an addition operation), however, in other examples, at least two of the combination operations may be different. For example, the algebraic expression (ab+c)d may be represented as the combination of the sub-algebraic expressions ab, c and d; where the first and second algebraic expressions ab and c are combined via an addition operation, and the third algebraic expression d is combined with the combination of the first and second algebraic expressions (ab+c) via a multiplication operation.

It is possible to cause an instantiation of the hardware design to evaluate a particular sub-algebraic expression if the output of each other sub-algebraic expression can be set to the identity for their combination without affecting the output of the particular sub-algebraic expression. The identity for an addition or subtraction combination is 0, whereas the identity for a multiplication combination is 1. For example, where the dot product X is represented by the sub-algebraic expressions $a_0b_0$, $a_1b_1$, . . . , $a_{n-1}b_{n-1}$, one can cause an instantiation of a hardware design configured to evaluate X to evaluate a particular sub-algebraic expression by setting all non-relevant variables (i.e. the variables not relevant to calculating the particular sub-algebraic expression) to zero. For example, one can cause an instantiation of such a hardware design to evaluate $a_0b_0$ by a setting all other $a_i$ and $b_i$ to zero.

It will be easier to cause an instantiation of a hardware design to calculate or evaluate a particular sub-algebraic expression if the sub-algebraic expressions are independent (i.e. they do not share any variables). However, it is not necessary that the sub-algebraic expressions be independent (i.e. do not share any variables) for the method 100 described herein to be used to verify such a hardware design. It is sufficient if each of the sub-algebraic expressions can be set to the identity for their combination. For example, the algebraic expression ab+bc may be represented by the combination of sub-algebraic expressions ab and bc. The first sub-algebraic expression (ab) can be set to the identity (i.e. 0) without affecting the output of the other sub-algebraic expression by setting a to zero. Similarly, the second sub-algebraic expression (bc) can be set to the identity (i.e. 0) without affecting the output of the other sub-algebraic expression by setting c to zero. Accordingly, the method 100 described herein may be used to verify a hardware design for a component that evaluates that algebraic expression even though the sub-algebraic expressions are not independent.

The method 100 begins at block 102, where, for each of the plurality of sub-algebraic expressions, it is verified that an instantiation of the hardware design correctly evaluates that sub-algebraic expression for all valid values of the relevant variables for that sub-algebraic expression. In other words, at block 102, it is verified that an instantiation of the hardware design correctly calculates each sub-algebraic expression in isolation.

For example, where the main algebraic expression is the dot product X $(a_0b_0+a_1b_1+ \ldots +a_{n-1}b_{n-1})$ and the sub-algebraic expressions comprise, $a_0b_0$, $a_1b_1$, . . . , and $a_{n-1}b_{n-1}$, then at block 102 it is verified that an instantiation of the hardware design correctly calculates $a_0b_0$ for all valid values of $a_0$ and $b_0$, it is verified that the hardware design correctly calculates $a_1b_1$ for all valid values of $a_1$ and $b_1$, and so on. Similarly, where the main algebraic expression is (ab+c)d and the sub-algebraic expression are ab, c and d, then at block 102 it is verified that an instantiation of the hardware design correctly calculates ab for all valid values of a and b, it is verified that an instantiation of the hardware design correctly calculates c for all valid values of c, and it is verified that an instantiation of the hardware design correctly calculates d for all valid values of d.

To verify that an instantiation of the hardware design correctly evaluates a sub-algebraic expression, the inputs to the instantiation of the hardware design are constrained so as to cause the instantiation to evaluate the sub-algebraic expression. For example, if the main algebraic expression is the dot product X $(a_0b_0+a_1b_1+ \ldots +a_{n-1}b_{n-1})$ and the sub-algebraic expressions are $a_0b_0$, $a_1b_1$, . . . , and $a_{n-1}b_{n-1}$, then constraining all of the inputs that are not relevant to evaluating a particular sub-algebraic expression to zero will cause an instantiation of the hardware design to evaluate the particular sub-algebraic expression. Specifically, to cause an instantiation of the hardware design to evaluate the sub-algebraic expression $a_0b_0$, all of the other input variables (i.e. $a_1$, $b_1$, $a_2$, $b_2$, . . . ) are constrained to be zero.

Once the design has been constrained to evaluate a particular sub-algebraic expression, the verification that the constrained instantiation correctly evaluates the sub-algebraic expression for all values of the relevant inputs/variables may be performed using any suitable method. For example, in some cases, the verification may be performed on the constrained instantiation using the naïve method described above. Specifically, it may be verified that the constrained instantiation correctly evaluates a sub-algebraic expression by verifying that the output of the constrained instantiation matches an output of a high-level model of the hardware design under the same constraint when they receive the same inputs.

In some cases, the verification of a sub-algebraic expression may be performed via formal verification. Formally verifying that an instantiation of the hardware design correctly evaluates a sub-algebraic expression may comprise generating a test bench in a formal verification language, such as, but not limited to SVA, comprising one or more assertions to be verified, one or more constraints (e.g. assumptions) and/or modeling logic; linking the test bench to the hardware design; and formally verifying, using a formal verification tool, that the one or more assertions are true (or hold) for the hardware design, and outputting one or more signals indicating whether the one or more assertions were successfully verified.

An assertion is a statement that a particular property is expected to hold for a hardware design (i.e. is always true). An assertion of the form "assert property [evaluable expression]" is said to "assert" the property specified by the "evaluable expression". If an asserted property (e.g. the evaluable expression) is evaluated to be false for the hardware design for any valid input, the hardware design is not behaving as expected and there is an error. For example, in the example assertion "assert property a=b"; if a is not equal to b at any point then the hardware design is not behaving as expected and there is an error.

Assertions are used to capture required temporal and combinational behaviour of the hardware design in a formal and unambiguous way. The hardware design can then be verified to determine that it conforms to the requirement as captured by the assertion(s). Since assertions capture the hardware design behaviour on a cycle-by-cycle basis they can be used to verify intermediate behaviours.

Assertions are typically expressed in an assertion language. An assertion language, which may also be referred to as a property language or a formal verification language, captures the hardware design behaviour spread across multiple hardware design cycles (e.g. clock cycles) in a concise, unambiguous manner. While traditional hardware description languages (HDL), such as an RTL language, have the ability to capture individual cycle behaviour, they are too detailed to describe properties at a higher level. In particular, assertion languages provide means to express temporal relationships and complex hardware design behaviours in a concise manner. Assertion languages include, but are not limited to, System Verilog Assertions (SVA), Property Specification Language (PSL), Incisive Assertion Library (IAL), Synopsys OVA (OpenVera Assertions), Symbolic Trajectory Evaluation (STE), SystemC Verification (SCV), 0-In, Specman, and OpenVera Library (OVL).

As is known to those of skill in the art, a constraint in formal verification constrains the state space under which formal verification is performed. In some cases, a constraint may be implemented by a formal assume statement, which may also be referred to as an assumption or an assumption statement. An example format for a formal assume statement is "assume property [FORMAL PROPERTY STATEMENT]" which causes a formal verification tool to formally verify an assertion only for states or sequences of states of an instantiation of the hardware design where FORMAL PROPERTY STATEMENT is true. For example, the example assume statement "assume property a>b" will cause a formal verification tool to only verify an assertion for states or sequences of states of an instantiation of the hardware design where a is greater than b.

The constraints/assumptions for a specific sub-algebraic expression will include constraints of the inputs that cause an instantiation of the hardware design to evaluate that specific sub-algebraic expression. The specific assertions and/or any other constraints that form the test bench for a specific sub-algebraic expression will be depend on the method used to verify that the constrained instantiation correctly evaluates that sub-algebraic expression. As described above, in some cases the naïve method may be used. If the sub-algebraic expression is sufficiently simple, then it is possible that the high-level model of the hardware design performs the sub-algebraic expression in a similar enough manner to the hardware design to allow such a verification to converge. Alternative methods for verifying the constrained instantiation correctly evaluates a sub-algebraic expression are described below.

The test bench (including the one or more assertions and one or more constraints/assumptions) may be linked to the hardware design by incorporating the test bench into the hardware design or binding the test bench to the hardware design. Specifically, the test bench may be bound to the relevant signals of the hardware design (i.e. the signals of the hardware design that are to be monitored and/or constrained).

Once the test bench has been linked to the hardware design, the hardware design, the test bench, and the bindings are loaded into a formal verification tool and the formal verification tool is configured to verify that the one or more assertions are true for the hardware design.

An assertion is verified by searching the entire reachable state space of the instantiation of the hardware design (e.g. state-transition system, or flow graph) without explicitly traversing all the states. The search is done by, for example, encoding the states using efficient Boolean encodings using Binary decision diagrams (BDDS), or using advanced SAT (satisfiability-based bounded model checking) based techniques. In some cases, tools can be used to implement techniques, such as, but not limited to, abstraction, symmetry, symbolic indexing, and invariants to improve performance and achieve scalability. Since formal verification of a property algorithmically and exhaustively explores all valid input values over time, verifying a property in this manner allows a property to be exhaustively proved or disproved for all valid states.

When a formal verification tool is used to verify an assertion, the formal verification tool may output an indication of whether or not the assertion is valid (i.e. the asserted property is true for all valid states or sequences of states), which may also be referred to herein as the assertion being successfully verified. The output may be yes, the assertion is valid or has been successfully verified; no, the assertion is not valid (i.e. the asserted property it is not true or has failed for at least one valid state or sequence of states) or has not been successfully verified; or the formal verification was inconclusive. The formal verification may be inconclusive, for example, because the computing-based device running the formal verification tool has run out of memory or because the formal verification tool has determined that a certain amount of progress has not been made after a predefined period of time.

Where an assertion is not valid or has not been successfully verified, the formal verification tool may also output information indicating a state or sequence of states of the hardware design which causes the asserted property to fail (e.g. a counter example). For example, the formal verification tool may output a trace of the verification indicating at what point, state or sequence of states the failure occurred.

The following is example pseudocode for a test bench for verifying that a hardware design for a component that evaluates the main algebraic expression $a_0b_0+a_1b_1+a_2b_2$ correctly evaluates the sub-algebraic expression $a_0b_0$. In this example, A is a copy of the hardware design, and B is a high-level model of the hardware design; A . . . [i] and B . . . [i] refer to the $i^{th}$ cycle of A and B respectively; A.output and B.output refer to the output of A and B respectively; A.ai and B.ai refer to the $a_i$ input or variable of A and B respectively; and A.bi and B.bi refer to the $b_i$ input or variable of A and B respectively.

```
//First set of constraints to cause A to evaluate a0b0 in cycle
// 0 ("[0]" denotes cycle 0)
assume property A.a1[0] == 0;
assume property A.b1[0] == 0;
assume property A.a2[0] == 0;
assume property A.b2[0] == 0;
//Second set of constraints to cause B to evaluate a0b0 in
// cycle 0 and use same a0 and b0 as A used in cycle 0
//("[0]" denotes cycle 0)
assume property B.a1[0] == 0;
assume property B.b1[0] == 0;
assume property B.a2[0] == 0;
assume property B.b2[0] == 0;
assume property B.a0[0] == A.a0[0];
assume property B.b0[0] == A.b0[0];
//Assertion to verify the output of B in cycle 0 matches the
//output of A in cycle 0
assert property B.output[0] == A.output[0];
```

A person of skill in the art would understand that the first set of constraints set all of the non-relevant variables of the hardware design A with respect to $a_0b_0$ (i.e. $a_1$, $b_1$, $a_2$, $b_2$) to zero in cycle 0, which causes the hardware design A to evaluate $a_0b_0$ in cycle 0. Similarly, the second set of constraints set all of the non-relevant variables of the high-level model of the hardware design B with respect to $a_0b_0$ (i.e. $a_1$, $b_1$, $a_2$, $b_2$) to zero in cycle 0, which causes the model B to evaluate $a_0b_0$ in cycle 0. The second set of constraints also set $a_0$ and $b_0$ of B in cycle 0 to the $a_0$ and $b_0$ of A in cycle 0. This means that, if the hardware design is working as expected, the output of A in cycle 0 should match the output of B in cycle 0, which is the property asserted in the assertion statement. Verifying this assertion, using a formal verification tool, for each valid value of $a_0$ and $b_0$, verifies that an instantiation of the hardware design correctly evaluates the sub-algebraic expression $a_0 b_0$.

Once the verifications of the sub-algebraic expressions have been performed, the method 100 proceeds to block 104.

At block 104, combinations of sub-algebraic expressions are formally verified until a combination that is equivalent to the main algebraic expression is verified.

Each combination combines two verified algebraic expressions, wherein each verified algebraic expression is one of a verified sub-algebraic expression and a verified combination. For example, where the main algebraic expression is the dot product X ($a_0 b_0 + a_1 b_1 + \ldots + a_{n-1} b_{n-1}$) and the sub-algebraic expressions are $a_0 b_0, a_1 b_1, \ldots,$ and $a_{n-1} b_{n-1}$, in block 102 each of the sub-algebraic expressions ($a_0 b_0, a_1 b_1, \ldots,$ and $a_{n-1} b_{n-1}$) will be verified. Then in block 104 the combination $a_0 b_0 + a_1 b_1$ may be verified. It can be seen that this combination combines two verified sub-algebraic expressions $a_0 b_0$ and $a_1 b_1$. Once that combination has been verified then the combination of ($a_0 b_0 + a_1 b_1$) + $a_2 b_2$ may be verified. It can be seen that this combination combines a previously verified combination ($a_0 b_0 + a_1 b_1$) and a verified sub-algebraic expression ($a_2 b_2$). As described in more detail below, each combination may be verified by comparing the output of an instantiation of the hardware design under a set of constraints to the output of an instantiation of the hardware design under different constraints. It is noted that to verify a combination it is not necessary that the two verified algebraic expressions thereof be verified prior to verifying the combination. It is sufficient if the verified algebraic expressions of the combination are verified at some point. As described in more detail below, this allows the verifications to be performed in parallel.

Accordingly, in block 104 more and more complex combinations are verified until a combination that is equivalent to the main algebraic expression is verified. The sub-algebraic expressions can be combined in any suitable manner so as to result in a combination that is equivalent to the main algebraic expression. For example, in some cases, each combination may add a sub-algebraic expression to the previous combination. For example, where the main algebraic expression is the dot product X ($a_0 b_0 + a_1 b_1 + \ldots + a_{n-1} b_{n-1}$) and the sub-algebraic expressions are $a_0 b_0, a_1 b_1, \ldots,$ and $a_{n-1} b_{n-1}$, the combination $a_0 b_0 + a_1 b_1$ may be verified first. Then the combination ($a_0 b_0 + a_1 b_1$) + $a_2 b_2$ may be verified. Then the combination ($a_0 b_0 + a_1 b_1 + a_2 b_2$) + $a_3 b_3$ may be verified. This adding of a sub-algebraic expression to the previous combination to form a new combination and verifying that new combination continues until ($a_0 b_0 + a_1 b_1 + a_2 b_2 + \ldots + a_{n-2} b_{n-2}$) + $a_{n-1} b_{n-1}$ is verified.

However, in other cases, the sub-algebraic expressions may be combined in a binary manner in which, for example, the sub-algebraic expressions are divided or grouped into pairs and the combination of each pair is verified. Then the pairs are divided or grouped into pairs and the combination thereof (comprising four sub-algebraic expressions) is verified. Then those combinations are divided into pairs and the combination thereof (comprising eight sub-algebraic expressions) is verified and so on. For example, where the main algebraic expression is the dot product X ($a_0 b_0 + a_1 b_1 + \ldots + a_{n-1} b_{n-1}$) and the sub-algebraic expressions are $a_0 b_0, a_1 b_1, \ldots,$ and $a_{n-1} b_{n-1}$, then the combinations of two sub-algebraic expressions, $a_0 b_0 + a_1 b_1$, $a_2 b_2 + a_3 b_3$, ..., $a_{n-2} b_{n-2} + a_{n-1} b_{n-1}$, may each be verified. Then the combinations of four sub-algebraic expressions ($a_0 b_0 + a_1 b_1$) + ($a_2 b_2 + a_3 b_3$), ..., ($a_{n-4} b_{n-4} + a_{n-3} b_{n-3}$) + ($a_{n-2} b_{n-2} + a_{n-1} b_{n-1}$) may each be verified. Then the combinations of eight sub-algebraic expressions, ($a_0 b_0 + a_1 b_1 + a_2 b_2 + a_3 b_3$) + ($a_4 b_4 + a_5 b_5 + a_6 b_6 + a_7 b_7$), ..., ($a_{n-8} b_{n-8} + a_{n-7} b_{n-7} + a_{n-6} b_{n-6} + a_{n-5} b_{n-5}$) + ($a_{n-4} b_{n-4} + a_{n-3} b_{n-3} + a_{n-2} b_{n-2} + a_{n-1} b_{n-1}$), may each be verified and so on. This may be referred to as a hierarchical set of combinations.

In yet other cases, a mix or hybrid of these two approaches may be used. For example, a subset of the sub-algebraic expressions may be grouped into pairs and the combination formed by each pair may be verified. Then each pair may then be combined with a sub-algebraic expression that was not in the subset, and each of those combinations may be verified and so on. It will be evident to a person of skill in the art that these are examples only and any combinations of sub-algebraic expressions which combine verified algebraic expressions and arrive at a combination that is equivalent to the main algebraic expression may be used.

Formally verifying a combination of sub-algebraic expressions comprises verifying that an instantiation of the hardware design correctly evaluates the combined expression for each valid value of the relevant variables. In the examples described herein, a combination may be formally verified by comparing the output of an instantiation of the hardware design that is constrained to evaluate the combination to instantiations of the hardware design constrained to evaluate each of the verified algebraic expressions in the combination. For example, let it have been verified that an instantiation of the hardware design correctly evaluates algebraic expression M, and that an instantiation of the hardware design correctly evaluates algebraic expression N, and in block 104 it is to be verified that an instantiation of the hardware design correctly evaluates the combination (M+N). In this example, the combination M+N may be verified by:

1. Constraining the inputs of an instantiation of the hardware design such that the instantiation evaluates M;
2. Constraining the inputs of an instantiation of the hardware design such that the instantiation evaluates N;
3. Constraining the inputs of an instantiation of the hardware design such that the instantiation evaluates M+N; Constraining the inputs of the instantiation that are relevant to evaluating M to be the same as in step 1; and Constraining the inputs of the instantiation that are relevant to evaluating N to be the same as in step 2; and
4. Formally verifying that the output of step 3 is equal to the output of step 1+step 2 for all valid values of the inputs/variables relevant to evaluating M and N.

For example, if the main algebraic expression is the dot product X ($a_0 b_0 + a_1 b_1 + \ldots + a_{n-1} b_{n-1}$) and the sub-algebraic expressions are $a_0 b_0, a_1 b_1, \ldots,$ and $a_{n-1} b_{n-1}$ and $a_0 b_0, a_1 b_1$ are verified in block 102 then the combination $a_0 b_0 + a_1 b_1$ may be verified in block 104 by:

1. Constraining all the $a_i$ and $b_i$, other than $a_0$ and $b_0$, of an instantiation of the hardware design to zero (i.e. $a_i = b_i = 0 \ \forall i \neq 0$) such that the instantiation evaluates $a_0 b_0$,
2. Constraining all the $a_i$ and $b_i$, other than $a_1$ and $b_1$, of an instantiation of the hardware design to zero (i.e. $a_i = b_i = 0 \ \forall i \neq 1$) such that the instantiation evaluates $a_1 b_1$;
3. Constraining all the $a_i$ and $b_i$, other than $a_0, a_1, b_0$ and $b_1$, of an instantiation of the hardware design to zero (i.e. $a_i = b_i = 0 \ \forall i \neq 0,1$) such that the instantiation evaluates $a_0 b_0 + a_1 b_1$; Constraining the $a_0$ and $b_0$ of the instantiation to be the same as the $a_0$ and $b_0$ used in step 1; and Constraining the $a_1$ and $b_1$ of the instantiation to be the same $a_1$ and $b_1$ used in step 2; and 4. Formally verifying that the output of step 3 is equal to the output of step 1+step 2 for all valid values of $a_0$, $a_1$, $b_0$ and $b_1$.

In some examples, this may be implemented using two copies of the hardware design under test. For example, where A and B denote two copies of the hardware design, and A[i] and B[i] denote the $i^{th}$ cycle of A and B respectively, the combination $a_0b_0+a_1b_1$ may be verified in block 104 by configuring A and B as follows:

A[0] is constrained such that $a_i=b_i=0$ $\forall i \neq 0$ so that A[0] evaluates $a_0b_0$;

A[1] is constrained such that $a_i=b_i=0$ $\forall i \neq 1$ so that A[1] evaluates $a_1b_1$;

B[0] is constrained such that $a_i=b_i=0$ $\forall i \neq 0,1$ so that B[0] evaluates $a_0b_0+a_1b_1$; $a_0$ and $b_0$ are equal to $a_0$ and $b_0$ of A[0]; and $a_1$ and $b_1$ are equal to $a_1$ and $b_1$ of A[1];

It is then formally verified that B[0]=A[0]+A[1] for all valid values of $a_0$, $a_1$, $b_0$ and $b_1$.

Figure 2:
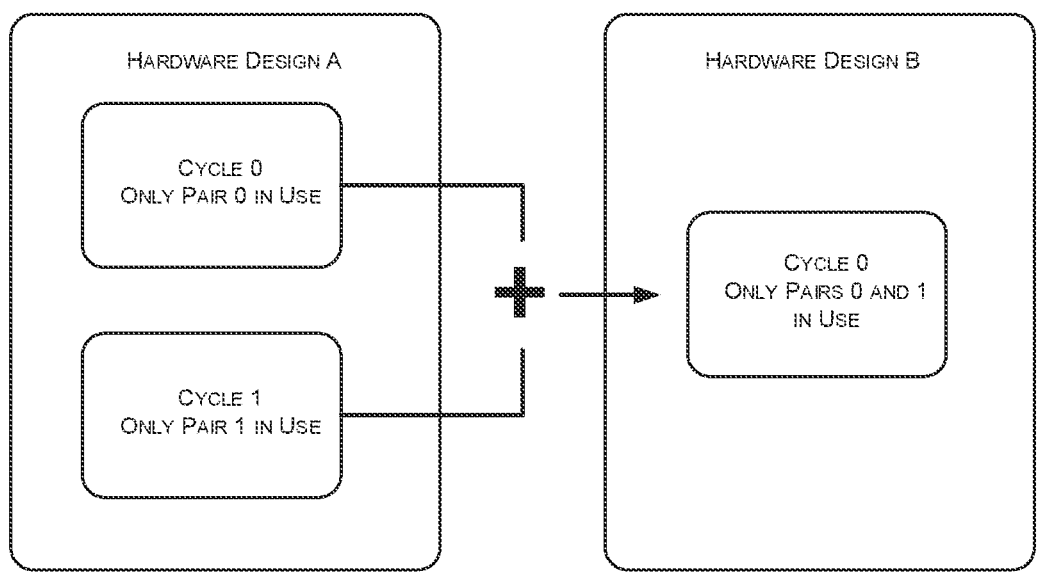
FIG. 2 is a schematic diagram illustrating verifying a combination using two copies of the hardware design.

This example in shown in FIG. 2.

In another example, this may be implemented using a single copy of the hardware design under test. For example, where A is a copy of the hardware design, and A[i] denotes the $i^{th}$ cycle of A, the combination $a_0b_0+a_1b_1$ may be verified in block 104 by configuring A as follows:

A[0] is constrained such that $a_i=b_i=0$ $\forall i \neq 0$ so that A[0] evaluates $a_0b_0$;

A[1] is constrained such that $a_i=b_i=0$ $\forall i \neq 1$ so that A[1] evaluates $a_1b_1$;

A[2] is constrained such that $a_i=b_i=0$ $\forall i \neq 0,1$ so that A[2] evaluates $a_0b_0+a_1b_1$; $a_0$ and $b_0$ are equal to $a_0$ and $b_0$ of A[0]; and $a_1$ and $b_1$ are equal to $a_1$ and $b_1$ of A[0];

It is then formally verified that A[2]=A[0]+A[1] for all valid values of $a_0$, $a_1$, $b_0$ and $b_1$ Formally verifying a combination in this manner makes it much more likely that the verification of the combination will converge. Firstly, verifying the combinations in this manner leverages the algebraic expressions that have already been verified to simplify the verification of the combinations. Secondly, while a component is not necessarily similar to a verification model, it is similar to itself, thus comparing the output of a hardware design to a different output of the hardware design leverages the self-similarity of the hardware design.

Formally verifying that an instantiation of the hardware design correctly evaluates a combination of sub-algebraic expressions in this manner may comprise generating a test bench in a formal verification language, such as, but not limited to SVA, that defines one or more assertions to be verified and the constraints under which the one or more assertions are to be verified (and, optionally, modeling logic); linking the test bench to one or more copies of the hardware design; and formally verifying, using a formal verification tool, that the one or more assertions are true (or hold) for the hardware design, and outputting one or more signals indicating whether the one or more assertions were successfully verified.

The following is example pseudocode for a test bench for verifying that a hardware design for a component that is configured to evaluate the main algebraic expression $a_0b_0+a_1b_1+a_2b_2$ correctly evaluates the combination $a_0b_0+a_1b_1$, and it will be verified in block 102 that the hardware design correctly evaluates $a_0b_0$ and correctly evaluates $a_1b_1$. In this example A is a first copy of the hardware design, B is a second copy of the hardware design; A . . . [i] and B . . . [i] refer to the $i^{th}$ cycle of the hardware designs A and B respectively; A.output and B.output refer to the output of hardware designs A and B respectively; A.ai and B.ai refer to the $a_i$ input or variable of hardware designs A and B respectively; and A.bi and B.bi refer to the $b_i$ input or variable of hardware designs A and B respectively.

```
//First set of constraints to cause A to evaluate a0b0 in cycle
// 0 ("[0]" denotes cycle 0)
assume property A.a1[0] == 0;
assume property A.b1[0] == 0;
assume property A.a2[0] == 0;
assume property A.b2[0] == 0;
//Second set of constraints to cause A to evaluate a1b1 in
//cycle 1 ("[1]" denotes cycle 1
assume property A.a0[1] == 0;
assume property A.b0[1] == 0;
assume property A.a2[1] == 0;
assume property A.b2[1] == 0;
//Third set of constraints to cause B to evaluate a0b0 +
//a1b1 in cycle 0 using a0,b0 from A(cycle 0) and a1,b1 from
// A(cycle 1)
assume property B.a2[0] == 0;
assume property B.b2[0] == 0;
assume property B.a0[0] == A.a0[0];
assume property B.b0[0] == A.b0[0];
assume property B.a1[0] == A.a1[1];
assume property B.b1[0] == A.b1[1];
//Assertion to verify B(cycle 0) = A(cycle 0) +
// A(cycle 1)
assert property B.output[0] == A.output[0] + A.output[1];
```

A person of skill in the art would understand that the first set of constraints set all of the non-relevant variables of the first copy of the hardware design A with respect to $a_0b_0$ (i.e. $a_1$, $b_1$, $a_2$, $b_2$) to zero in cycle 0, which causes the first copy of the hardware design A to evaluate $a_0b_0$ in cycle 0. Similarly, the person of skill in the art would understand that the second set of constraints set all of the non-relevant variables of the first copy of the hardware design A with respect to $a_1b_1$ (i.e. $a_0$, $b_0$, $a_2$, $b_2$) to zero, which causes the first copy of the hardware design A to evaluate $a_1b_1$ in cycle 1.

The third set of constraints set all of the non-relevant variables of the second copy of the hardware design B with respect to $a_0b_0+a_1b_1$ (i.e. $a_2$, $b_2$) to zero in cycle 0 so as to cause the second copy of the hardware design to evaluate $a_0b_0+a_1b_1$. The third set of constraints also sets $a_0$ and $b_0$ of the hardware design B to the $a_0$ and $b_0$ of the hardware design A in cycle 0, and sets $a_1$ and $b_1$ of the hardware design B to the $a_1$ and $b_1$ of the hardware design A in cycle 1. This means that if the hardware design is working as expected the output of B in cycle 0 should be the sum of the output of A in cycle 0 and the output of A in cycle 1. And this is the test set out in the assertion statement. Verifying this assertion, using a formal verification tool, for each valid value of $a_0$, $b_0$, $a_1$, $b_1$, verifies that an instantiation of the hardware design correctly evaluates $a_0b_0+a_1b_1$.

Once the combination verifications are complete, the method 100 may end or the method 100 may proceed to block 106.

At block 106, a determination may be made as to whether the verifications in blocks 102 and 104 were successful. As described above, when a formal verification tool is used to verify an assertion for a hardware design, the formal verification tool may output a signal or a set of signals that indicates whether or not the assertion is valid (i.e. the asserted property is true for all valid states or sequence of states). In these cases, the determination as to whether the verifications were successful may be based on the output signal(s).

If it is determined that the verifications were successful (indicating that an instantiation of the hardware design will work as expected), the method 100 may proceed to block 110 where an integrated circuit embodying the component described by the hardware design is manufactured. If, however, it is determined at block 106 that one or more of the verifications performed in block 102 or block 104 was not successful, then the method 100 may proceed to block 108.

At block 108, the hardware design is modified to correct the error(s) in the hardware design that caused the verification(s) to fail. In some cases, the information indicating a state or sequence of states of the hardware design which caused an asserted property to fail (e.g. a counter example) may be used to identify/locate the error(s) in the hardware design. Once the hardware design has been modified, the modified hardware design may be re-verified (e.g. blocks 102-110 may be repeated for the modified hardware design).

Although in the example method 100 of FIG. 1 all of the verifications are performed and then it is determined whether any of the verifications failed, in other examples, once one verification has failed the method may proceed to block 108.

Any and all of the verifications in blocks 102 and 104 may be performed in parallel. For example, all or a portion of the sub-algebraic expression verifications may be performed in parallel, all or a portion of the combination verifications may be performed in parallel, or all or a portion the sub-algebraic expression verifications may be performed in parallel with all or a portion of the combination verifications.

Although in the example method 100 of FIG. 1 the verifications described with respect to block 102 (i.e. the verifications that an instantiation of the hardware design correctly evaluates the sub-algebraic expressions) are completed via formal verification, in other examples one or more of the sub-algebraic expression verifications may be completed via other suitable verification methods. For example, in some cases one or more of the sub-algebraic expression verifications may be performed via simulation-based verification. However, depending on the type of component, the number of inputs and the bit-width thereof the possible inputs may be quite large which may make performing a sub-algebraic verification via simulation intractable.

Optimizing the Verifications in Block 102

As described above, any known method may be used to verify that an instantiation of the hardware design correctly evaluates a sub-algebraic expression. For example, verifying that an instantiation of the hardware design correctly evaluates a sub-algebraic expression may comprise verifying, for all valid values of the relevant inputs or variables (the inputs or variables relevant to evaluating the sub-algebraic expression), that the output of an instantiation of the hardware design constrained to evaluate the sub-algebraic expression and the output of higher-level model of the hardware design constrained in the same manner match when they receive the same inputs. However, depending on the complexity of the sub-algebraic expression that is being verified, and the similarity of the hardware design and the high-level model, a formal verification tool may find such a verification difficult.

Accordingly, one or more techniques may be used to simplify such a verification.

Polynomial

Where the sub-algebraic expression is polynomial in one of its input variables the verification that an instantiation of the hardware design correctly evaluates a sub-algebraic expression may be simplified using one of a plurality of polynomial verification techniques. As is known to those of skill in the art, a polynomial is a mathematical expression of one or more terms each of which consists of a constant (which may also be referred to as a coefficient) multiplied by one or more variables (which may also be referred to as indeterminates) raised to a nonnegative integer power. The exponent on a variable in a term is called the degree or order of that variable in that term. The degree or order of the polynomial is the largest degree or order of any one term with a nonzero coefficient. For example, a polynomial $P_x$ in the indeterminate x with degree n is defined in equation (1) wherein $c_0, c_1 \ldots c_n$ are the constants:

$$P_x = c_0 + c_1 x + c_2 x^2 + \cdots + c_n x^n \tag{1}$$

An expression is polynomial in an input variable if when you fix all the other input variables, the output of the expression for that input variable can be determined by evaluating a polynomial. As is known to those of skill in the art, evaluating a polynomial comprises substituting a numerical value for each indeterminate and carrying out the indicated multiplications and additions/subtractions.

One polynomial verification technique (which may be referred to as the polynomial of known degree technique) is described in the Applicant's co-pending UK patent application no. 1905297.6, which is herein incorporated by reference in its entirety. In that technique it is verified that an instantiation of a hardware design correctly evaluates an expression that is polynomial of degree k in x for a set of values X of x by: (i) formally verifying, using a formal verification tool, that an instantiation of the hardware design evaluates an expression that is polynomial of degree k in x for the set X of values of x; and (ii) verifying that an instantiation of the hardware design generates the correct output in response to at least k+1 distinct values of x. Formally verifying that an instantiation of a hardware design evaluates an expression that is polynomial of degree k for an input variable x for a set X of values of x comprises formally verifying that an instantiation of the hardware design has a constant $k^{th}$ difference with respect to x for the set X of values of x.

This technique works due to the mathematical fact that if it is verified that an instantiation of the hardware design evaluates an expression that is polynomial of degree k with respect to an input variable x (i.e. has a constant $k^{th}$ difference) for a set of values of x then if an instantiation of the hardware design generates the expected output for k+1 distinct values of x in the set X of values then the instantiation of the hardware design will produce an expected output for all values of x in the set X.

Such a method has proven much more likely to converge (i.e. produce a conclusive result) than simply formally verifying that an instantiation of the hardware design correctly evaluates the expression for all values of x in the set X of values, particularly when the set X of values is large and/or the expression is complex. This is because formal verification tools are very proficient at verifying things that are similar and formally verifying that an instantiation of a hardware design has a constant $k^{th}$ difference involves comparing the output for similar inputs. Thus the formal verification of the constant $k^{th}$ difference is likely to converge. Furthermore, once a constant $k^{th}$ difference has been verified, the minimum number of values of x for which the output needs to be verified is significantly reduced (i.e. reduced to k+1 in some cases and to k in other cases). In other words, verifying a constant $k^{th}$ difference produces a significant reduction in the state space for which the correct output is verified.

Accordingly, when the sub-algebraic expression is polynomial of degree k in an input variable x for all values of x in the set X, it may be verified that an instantiation of the hardware design correctly evaluates the sub-algebraic expression by:
1. Verifying that for all x in X that an instantiation of the hardware design under one or more constraints that cause it to evaluate the sub-algebraic expression has a constant $k^{th}$ difference; and
2. Verifying for only k+1 different values of x that an instantiation of the hardware design under the one or more constraints that cause it to evaluate the sub-algebraic expression correctly evaluates the sub-algebraic expression.

UK patent application no. 1905297.6 describes a number of techniques which may be used to perform the verifications in steps 1 and/or 2 above more efficiently. Any of these techniques may be used to implement the verifications in steps 1 and/or 2 when they are used to verify that an instantiation of a hardware design correctly evaluates a sub-algebraic expression.

For example, UK patent application no. 1905297.6 describes that the number of different values of x over which the correct output is verified may be reduced to k if the constant $k^{th}$ difference c is known in advance and it is verified that the $k^{th}$ difference for all values of x in X is equal to the expected constant c. This means that if the expression is linearly polynomial in x that it only needs to be verified that an instantiation produces the correct result to the sub-algebraic expression for only one value of x.

UK patent application no. 1905297.6 describes that verifying that an instantiation of a hardware design has a constant $k^{th}$ difference may comprise comparing (or at least computing) the output of the instantiation in response to an input variable x and the output of the instantiation in response to x+1 for all values of x in the relevant set X of values. Where the input variable is an n-bit integer, generating x+1 may, in some cases, result in a long carry. Specifically generating x+1 may involve flipping a lot of bits of x. For example, if x is an 8-bit integer equal to 0 1 1 1 1 1 1 1 then x+1 is 1 0 0 0 0 0 0 0 which requires flipping all of the bits. Depending on the hardware design, the formal verification tool may find it difficult to verify the constant difference in a single step for all relevant values of x due to the long carries. For example, some hardware designs for an integrated circuit that evaluates a large dot product expression may be configured to split operands up into component parts and sum them in separate locations. In such cases, the logic for processing x and x+1 may change significantly making it difficult for a formal verification tool to verify the difference is as expected.

Accordingly, in some cases, to avoid long carries and the problems associated therewith in formal verification, where the constant difference is known in advance, instead of verifying that an instantiation of a hardware design has a constant $k^{th}$ difference with respect to x by formally verifying a single property for all relevant values of x (e.g. verifying F(x+1)−F(x)=c where F is an instantiation of the hardware design) it may be more efficient to verify the constant difference at a bit-level in order to avoid large carries between x and x+1. Specifically, instead of verifying that the difference in the output of an instantiation of the hardware design F for consecutive values of x in the set X of values is equal to a constant c (i.e. F(x+1)−F(x)=c), verifying for each bit of x that the difference in the outputs of an instantiation of the hardware design F for a first value of x and a second value of x is equal to $2^{i}*c$ wherein the $i^{th}$ least significant bit (LSB) of the second value of x is 0 and the $i^{th}$ LSB of the first value of x is 1 and all other bits of the first value of x and the second value of x are the same. This is expressed in equation (2) wherein $x'_i$ is the first value of x and $x''_i$ is the second value of x. Equation (2) can alternatively be expressed as equation (3) as the difference between $x'_i$ and $x''_i$ will be $2^i$. By always changing a single bit from 0 to 1 there will be no carries in x. It is noted that there still may be carries once x is multiplied by its coefficient, but only changing a single bit between $x'_i$ and $x''_i$ can significantly simplify the carry logic.

$$F(x'_i) - F(x''_i) = 2^i * c \quad (2)$$

$\forall x'_i, x''_i \in X$ wherein the $i^{th}$ LSB of $x'_i$=1 and the $i^{th}$ LSB of $x''_i$=0; and all other bits of $x'_i$ and $x''_i$ are the same $$F(x + 2^i) - F(x) = 2^i * c \quad (3)$$

$\forall x \in X$ wherein the $i^{th}$ LSB of x is zero

For example, if the objective is to verify that F(x+1)−F(x)=c wherein x is a 4-bit binary number and c is a constant then this can be verified by:
1. Verifying that F(x+1)−F(x)=c for all values of x in the relevant set X of values wherein the $0^{th}$ LSB of x is zero;
2. Verifying that F(x+2)−F(x)=2c for all values of x in the relevant set X of values wherein the $1^{st}$ LSB of x is zero;
3. Verifying that F(x+4)−F(x)=4c for all values of x in the relevant set X of values wherein the $2^{nd}$ LSB of x is zero; and
4. Verifying that F(x+8)−F(x)=8c for all values of x in the relevant set X of values wherein the $3^{rd}$ LSB (i.e. the MSB) of x is zero.

Each of the verifications in steps 1 to 4 above may be referred to as a bit verification. It will be evident to a person of skill in the art that the bit verifications may alternatively be framed as an addition as opposed to a subtraction. An example of equation (3) written as an addition, opposed to a subtraction, is shown in equation (4):

$$F(x + 2^i) = F(x) + 2^i * c \quad (4)$$

In some cases, to simplify the bit verifications and increase the likelihood that they will converge, a hierarchy or ordering of the bits may be developed or generated and the verification for the highest bit in the hierarchy is performed as described above (i.e. under the assumption that the $i^{th}$ LSB of x is zero), however the verification for any other bit in the hierarchy is performed under an assumption or constraint that any bit higher in the hierarchy is set to zero.

For example, if the objective is to verify that F(x+1)−F(x)=c wherein x is a 4-bit binary number, c is a constant and the bits are ordered from lowest to highest (i.e. the $0^{th}$ bit is the highest in the hierarchy and the $3^{rd}$ bit is the lowest in the hierarchy) then this can be verified by:

1. Verifying that $F(x+1)-F(x)=c$ for all values of x in the relevant set of values wherein the LSB of x is zero;
2. Verifying that $F(x+2)-F(x)=2c$ for all values of x in the relevant set of values wherein the first two LSBs of x are zero;
3. Verifying that $F(x+4)-F(x)=4c$ for all values of x in the relevant set of values wherein the first three LSBs of x are zero; and
4. Verifying that $F(x+8)-F(x)=8c$ for $x=0$.

It will be evident to a person of skill in the art that this is an example ordering or hierarchy of the bits and any other ordering of the bits may be used. For example, if the objective is to verify that $F(x+1)-F(x)=c$ wherein x is a 4-bit binary number, c is a constant and the bits are ordered from highest to lowest (i.e. the $3^{rd}$ bit is the highest in the hierarchy and the $0^{th}$ bit is the lowest in the hierarchy) then this can be verified by:

1. Verifying that $F(x+8)-F(x)=8c$ for all values of x in the relevant set of values wherein the MSB of x is zero;
2. Verifying that $F(x+4)-F(x)=4c$ for all values of x in the relevant set of values wherein the first two MSBs of x are zero;
3. Verifying that $F(x+2)-F(x)=2c$ for all values of x in the relevant set of values wherein the first three MSBs of x are zero; and
4. Verifying that $F(x+1)-F(x)=c$ for $x=0$.

Although the bitwise method of verifying a constant $k^{th}$ difference for a hardware design is described above for $k=1$ (i.e. for a linear polynomial) a person of skill in the art would understand that the bitwise method can similarly be used to verify a constant higher order difference.

Permutation Invariant

Where two of the sub-algebraic expressions are the same (i.e. have the same number of input variables and same algebraic operation(s)) and the main algebraic expression is permutation invariant with respect to the two sub-algebraic expressions, then if one of the sub-algebraic expressions is verified using any suitable technique, the verification of the other sub-algebraic expression may be simplified by comparing the output of an instantiation of the hardware design constrained to evaluate the first sub-algebraic expression to the output of an instantiation of the hardware design constrained to evaluate the second sub-algebraic expression.

For example, if the main algebraic expression is the dot product $X$ $(a_0b_0+a_1b_1+\ldots+a_{n-1}b_{n-1})$ and the sub-algebraic expressions comprise, $a_0b_0$, $a_1b_1$, ..., and $a_{n-1}b_{n-1}$, then $a_0b_0$ and $a_1b_1$ are the same (i.e. they have the same number of input variables and the same algebraic operations); and X is permutation invariant with respect to $a_0b_0$ and $a_1b_1$ i.e. $X(a_0, b_0, a_1, b_1)=X(a_1, b_1, a_0, b_0)$. Therefore $X(a_0, b_0, 0, 0)=X(0, 0, a_0, b_0)$. Therefore, if it is verified that an instantiation of the hardware design correctly evaluates $a_0b_0$, it can be verified that an instantiation of the hardware design correctly evaluates $a_1b_1$ by:

1. Constraining an instantiation of the hardware design to evaluate $a_0b_0$ (e.g. all inputs except $a_0b_0$ constrained to zero).
2. Constraining an instantiation of the hardware design to evaluate $a_1b_1$ (e.g. all inputs except $a_1b_1$ constrained to zero; and constraining $a_1$ and $b_1$ to be equal to $a_0$ and $b_0$ used in step 1.
3. Formally verifying that the output of step 1=the output of step 2 for all values of $a_0$ and $b_0$.

Formally verifying a sub-algebraic expression in this manner is much more likely to converge then verifying a sub-algebraic expression by comparing the output of an instantiation of the hardware design under a set of constraints to a high-level model of the hardware design because (i) comparing two calculations that are similar is easier for a formal verification tool than comparing two calculations which may be different; and (ii) comparing a design to itself is easier for a formal verification tool than comparing a hardware design to something else.

Where all of the sub-algebraic expressions are the same and the main algebraic expression is permutation invariant with respect to all of the sub-algebraic expressions, then if one sub-algebraic expression is verified using any suitable method all of the other sub-algebraic expressions can be verified by comparing the output of an instantiation of a hardware design constrained to evaluate that sub-algebraic expression to an output of an instantiation of the hardware design constrained to evaluate the other sub-algebraic expression.

Optimizing the Combination Verifications in Block 104

Permutation Invariant

In some cases, the same permutation technique described above for simplifying the verification of a sub-algebraic expression may be used to simplify the verification of a combination. For example, if two combinations are the same (i.e. they have the same number of inputs and the same operations) and the main algebraic expression is permutation invariant with respect to the two combinations then, if one of the combinations is verified using any known technique, the other combination can be verified by comparing the output of an instantiation of the hardware design constrained to evaluate the other combination to an output of an instantiation of the hardware design constrained to evaluate the verified combination.

For example, if the main algebraic expression is the dot product $X$ $(a_0b_0+a_1b_1+\ldots+a_{n-1}b_{n-1})$ and the sub-algebraic expressions comprise, $a_0b_0$, $a_1b_1$, ..., and $a_{n-1}b_{n-1}$, then the combination $a_0b_0+a_1b_1$ is the same as the combination $a_2b_2+a_3b_3$ (i.e. they have the same number of input variables and the same algebraic operations); and X is permutation invariant with respect to $a_0b_0$ and $a_1b_1$ i.e. $X(a_0, b_0, a_1, b_1, a_2, b_2, a_3, b_3)=X(a_2, b_2, a_3, b_3, a_0, b_0, a_1, b_1)$. Therefore $X(a_0, b_0, a_1, b_1, 0, 0, 0, 0)=X(0, 0, 0, 0, a_0, b_0, a_1, b_1)$. Therefore if it is verified that an instantiation of the hardware design correctly evaluates the combination $a_0b_0+a_1b_1$ (e.g. using the combination verification technique described above), it can be verified that an instantiation of the hardware design correctly evaluates the combination $a_2b_2+a_3b_3$ by:

1. Constraining an instantiation of the hardware design to evaluate the combination $a_0b_0+a_1b_1$ (e.g. all inputs except $a_0, b_0, a_1, b_1$ constrained to zero).
2. Constraining an instantiation of the hardware design to evaluate the combination $a_2b_2+a_3b_3$ (e.g. all inputs except $a_2, b_2, a_3, b_3$ constrained to zero); and constraining $a_2, b_2, a_3, b_3$ to be equal to $a_0, b_0, a_1, b_1$ used in step 1.
3. Formally verifying that the output of step 1=the output of step 2 for all values of $a_0, b_0, a_i, b_1$.

Accordingly, using the permutation technique to simplify sub-algebraic expression and combination verifications may allow a hardware design for a main algebraic expression $a_0b_0+a_1b_1+a_2b_2+a_3b_3$ to be verified as follows:

Verify $a_0b_0$ using any technique;
Verify $a_1b_1$ using the permutations technique (e.g. by comparing it to $a_0b_0$);
Verify $(a_0b_0)+(a_1b_1)$ using the combinations technique described above;
Verify $a_2b_2+a_3b_3$ using the permutations technique (e.g. by comparing it to $a_0b_0+a_1b_1$); and Verify $(a_0b_0+a_1b_1)+(a_2b_2+a_3b_3)$ using the combinations technique described above.

In some cases, verifying $a_2b_2+a_3b_3$ using the permutations technique may cause $a_2b_2+a_3b_3$ to be viewed as a sub-algebraic expression.

Polynomial

As described above, in the polynomial of known degree technique a hardware design that evaluates an expression that is polynomial of degree k in an input variable x for a set of values X of x can be verified by: (i) verifying that an instantiation of the hardware design evaluates an expression that is polynomial of degree k by verifying that for all x in X that the hardware design has a constant $k^{th}$ difference; and (iii) verifying that an instantiation of a hardware design correctly evaluates the expression for k+1 different values of x.

As described in the Applicant's co-pending UK patent application, filed the same day as the present application and entitled "VERIFICATION OF HARDWARE DESIGN FOR AN INTEGRATED CIRCUIT THAT IMPLEMENTS A FUNCTION THAT IS POLYNOMIAL IN ONE OR MORE SUB-FUNCTIONS", the polynomial of known degree technique is not limited to verifying hardware designs for components that evaluate an expression that is polynomial in an input variable, but can also be used to verify a hardware design for a component that evaluates an expression, which may or may not be polynomial in an input variable, can be represented as a polynomial of a function and the inputs of an instantiation of the hardware design can be constrained so as to cause the instantiation to evaluate the function.

For example, let there be a hardware design for a component that evaluates an algebraic expression G that has variables $a_0$, $a_1$, x and y. G may or may not be polynomial in x or y per se, but G may be expressed or represented as a polynomial of some function p(x, y) as shown in equation (5) then the hardware design may be verified using the polynomial of known degree technique.

$$G(a_0, a_1, x, y) = a_1 * p(x, y) + a_0 \quad (5)$$

Specifically such a hardware design may be verified by:
1. Verifying for all values of the variable(s) to that function (e.g. x, y) that an instantiation of the hardware design correctly evaluates the function (e.g. p(x, y));
2. Verifying that for all values of the function (e.g. p(x, y)) that an instantiation of the hardware design has a constant $k^{th}$ difference (e.g. k=1 for G); and
3. Verifying that an instantiation of the hardware design generates the correct output in response to k+1 values of the function (e.g. p(x, y)).

If the expression (e.g. G) is linearly polynomial in the function (e.g. p(x, y)), step 2 comprises verifying that for consecutive values of p(x, y) that the difference in the output of the expression (G) is constant—e.g. $G(a_0, a_1, x', y')-G(a_0, a_1, x, y)$=constant for any x, y and x', y' wherein p(x, y)+1=p(x', y').

Since it may be difficult to determine which values of the inputs x', y' will result in p(x', y')=p(x, y)+1 for a particular x, y, step 2 can be implemented by constraining the output. For example, step 2 may be implemented using two copies of the hardware design under test, A and B, wherein A[i] and B[i] refer to the $i^{th}$ cycle of A and B respectively by:
Constraining A[0] such that $a_1$=1 and $a_0$=0 so that A[0] evaluates p(x, y);
Constraining A[1] such that $a_1$=1, $a_0$=0, and A[0]=A[0]+1 so that the formal verification tool selects an x and y such that A[1]=A[0]+1;
Constraining B[0] such that x=x of A[0] and y=y of A[0];
Constraining B[1] such that x=x of A[1], y=y of A[1], $a_1$=$a_1$ of B[0] and $a_0$=$a_0$ of B[0]; and
Verifying that B[0]−B[1]=constant for all x and y.

As noted above, forcing the output of A[1] to be equal to A[0]+1 causes the formal verification tool to select an x', y' that will result in p(x', y')=p(x, y)+1 where x, y were those used in A[0]. This verifies that the hardware design evaluates an expression that is polynomial with respect to p(x, y). Any of the optimization techniques described above for the general polynomial of known degree technique, such as incrementing values bitwise, can equally be applied to simplify the verification.

The inventors have discovered that this technique can be used to simplify the verification of a combination in block 104 of the method 100 of FIG. 1 where the verified algebraic expressions are combined using addition. Specifically, where the combination combines two verified algebraic expressions M and N (wherein each of M and N is a verified sub-algebraic expression or a verified combination) via addition one is verifying B=A+A' wherein:
A is the output of an instantiation of the hardware design when constrained to evaluate M (e.g. $a_0b_0$);
A' is the output of an instantiation of the hardware design when constrained to evaluate N (e.g. $a_1b_2$);
B is the output of an instantiation of the hardware design when constrained to evaluate M+N (e.g. $a_0b_0+a_1b_2$)

It can be seen that B is polynomial in A and A', so the verification of B can be performed using the output constrained polynomial of known degree method. Specifically, it is first verified that B is polynomial in A by verifying that B(A+1, A')=B(A, A')+1.

This can be done using two copies of the hardware design A and B by:
Constraining A[0] to evaluate M;
Constraining A[1] to evaluate M, and A[1]=A[0]+1—i.e. any inputs relevant to evaluating M are selected so that A[1]=A[0]+1
Constraining B[0] to evaluate the combination M+N, and constraining the inputs relevant to calculating M to be the same as A[0];
Constraining B[1] to evaluate the combination M+N, constraining inputs relevant to calculating M to be the same as A[1], and constraining the inputs relevant to calculating N to be the same as in B[0]; and
Verifying B[1]=B[0]+1 for all values of the relevant inputs.

Specifically, where the main algebraic expression is the dot product X it can be verified that the combination $a_0b_0+a_1b_1$ is linearly polynomial in $a_0b_0$ by:
Constraining A[0] such that all $a_i$ and $b_i$ are zero except $a_0$ and $b_0$ so that A[0] evaluates $a_0b_0$;
Constraining A[1] such that all $a_i$ and $b_i$ are zero except $a_0$ and $b_0$ and A[1]=A[0]+1;
Constraining B[0] such that all $a_i$ and $b_i$ are zero except $a_0$, $b_0$, $a_1$ and $b_1$; and $a_0$, $b_0$ are the same as $a_0$, $b_0$ of A[0];
Constraining B[1] such that all $a_i$ and $b_i$ are zero except $a_0$, $b_0$, $a_1$ and $b_1$; and $a_0$, $b_0$ are the same as $a_0$, $b_0$ of A[1]; and $a_1$, $b_1$ are the same as $a_1$, $b_1$ of B[0]; and
Verifying that B[1]=B[0]+1 for all $a_0$, $b_0$, $a_1$ and $b_1$.

Although in these examples the verification is implemented using two copies of the hardware design, it will be evident to a person of skill in the art that this is an example only and that the verification may be implemented using any number of copies of the hardware design (e.g. one or more than two).

Where the combination is a dot product, once it has been verified that B is polynomial in A it isn't necessary to verify that B is polynomial in A' as this has already been proven. Specifically by proving B(A+1, A')=B(A, A')+1 (i.e. that B is polynomial in A) it has been proven that B=A+c and that c is not dependent on A. It has also been proven that c is not dependent on the input variables to A (e.g. $a_0$ and $b_0$) because when A was incremented by 1 (which includes incrementing one of the input variables (e.g. $a_0$ or $b_0$)) to A), B is incremented by 1 thus c is not dependent on the input variables to A (e.g. $a_0$ and $b_0$). Therefore fixing the input variables to A (e.g. $a_0$ and $b_0$) to zero will not affect c. Therefore it has already been proven that B=A' when A=0 (e.g. when $a_0$ and $b_0$ are zero) when it was proved that an instantiation of the hardware design correctly evaluates A' (e.g. $a_1 b_1$) therefore c=A'.

It is noted that although in all of the examples above the combination is linearly polynomial in one of the verified algebraic expressions with a coefficient of 1, this technique is not limited to the case where B is linearly polynomial in A and the coefficient is 1. B only needs to be polynomial in A.

System

Figure 3:
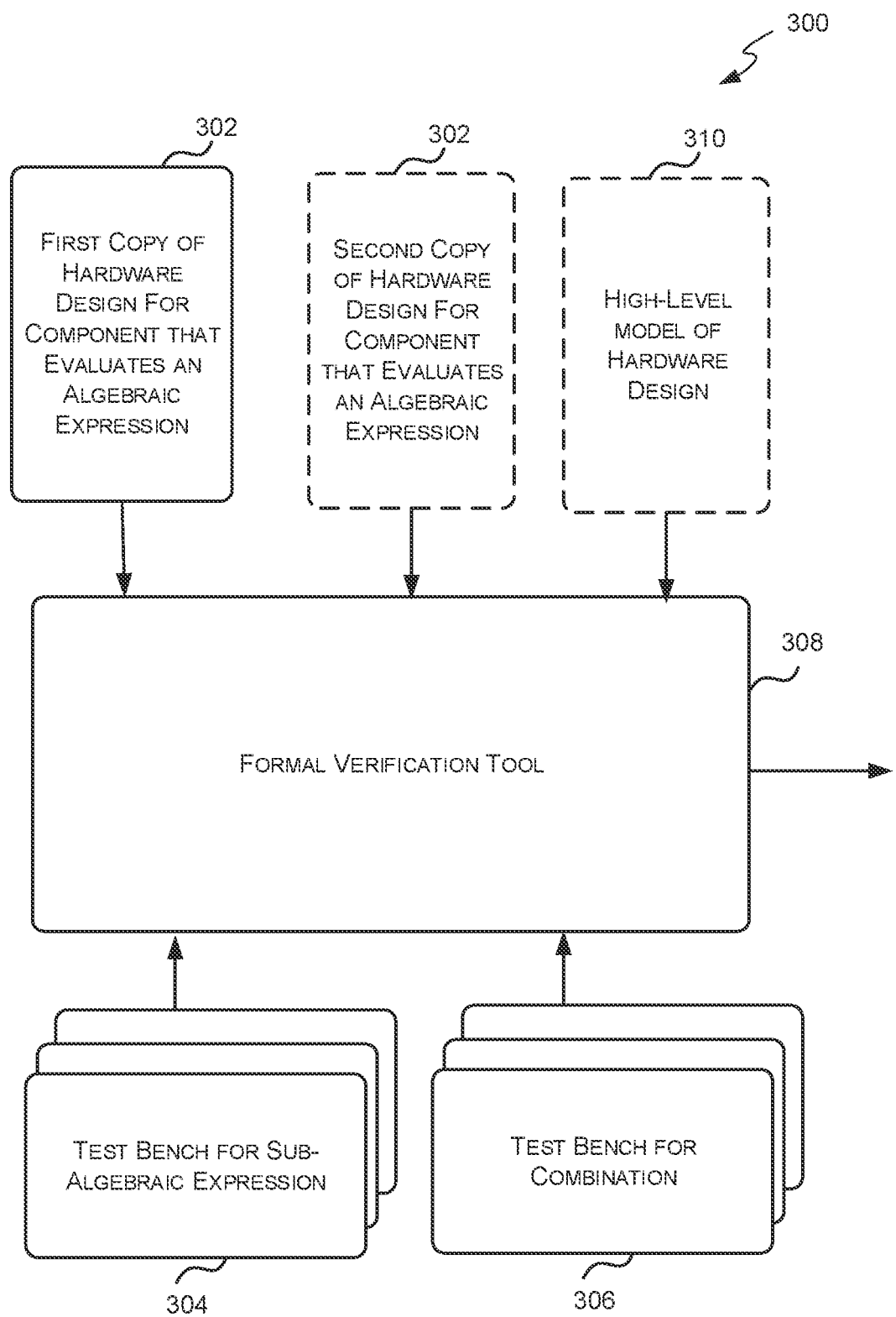
FIG. 3 is a block diagram of an example system for verifying a hardware design for a component that evaluates an algebraic expression.

Reference is now made to FIG. 3 which illustrates an example system 300 for verifying a hardware design for a component that evaluates a main algebraic expression. The system 300 may be implemented by one or more computing-based devices, such as the computing-based device 400 described below with respect to FIG. 4. For example, one or more of the components of the system 300 of FIG. 3 may be implemented as computer readable instructions, which, when executed by a computing-based device, cause the computing-based device to perform the functions of the component described below.

As described above, in the examples described herein, the main algebraic expression can be represented as a combination of sub-algebraic expressions, and the inputs of the hardware design can be constrained to cause an instantiation of the hardware design to evaluate each sub-algebraic expression.

The system 300 comprises one or more copies of the hardware design 302; a test bench 304 for each sub-algebraic expression; a test bench 306 for one or more combinations of sub-algebraic expressions, each combination combining M and N where each of M and N are verified sub-algebraic expressions or verified combinations, and the one or more combinations comprising a combination that is equivalent to the main algebraic expression; and a formal verification tool 308. In some cases, the system 300 may also comprise a high-level model of the hardware design 310.

The test bench 304 for each sub-algebraic expression comprises a set of one or more constraints (e.g. assumptions) which cause an instantiation of the hardware design to evaluate that sub-algebraic expression, and a set of one or more assertions, which, if verified to be true for the hardware design under the specified constraints, verifies that a instantiation of the hardware design correctly evaluates the sub-algebraic expression. The one or more assertions may be dependent on the method used to verify that an instantiation of the hardware design correctly evaluates the sub-algebraic expression. Each test bench 304 may also, optionally, comprise additional constraints and/or modeling logic depending on the method used to verify that an instantiation of the hardware design correctly evaluates the sub-algebraic expression.

For example, where the naïve method is used to verify that an instantiation of the hardware design correctly evaluates the sub-algebraic expression, the one or more assertions may compare the output of the instantiation under the set of constraints to an output of a high-level model of the hardware design under the set of constraints when they receive the same inputs.

The test bench 306 for each combination may comprise a first set of constraints (e.g. assumptions) which cause an instantiation of the hardware design to evaluate the combination, a second set of constraints which cause an instantiation of the hardware design to evaluate the first verified algebraic expression M of the combination, a third set of constraints which cause an instantiation of the hardware design to evaluate the second verified algebraic expression N of the combination; and a set of one or more assertions which if verified to be true, verify that the instantiation of the hardware design correctly evaluates the combination of algebraic expressions M and N. The one or more assertions may compare an output of an instantiation of the hardware design under the first set of constraints, to the output of the instantiations of the hardware design under the second and third constraints.

Verifying each of the one or more assertions for each test bench 304, 306 for the hardware design verifies that an instantiation of the hardware design correctly evaluates the main algebraic expression.

Each test bench 304, 306 is linked to the relevant hardware design(s) so that the one or more assertions of each test bench are connected to the relevant signals of the hardware designs so as to be able to evaluate the asserted property/properties. As described above, a test bench 304, 306 may be linked to a hardware design by binding the test bench 304, 306 to the hardware design 302 or incorporating the test bench into the hardware design.

As described above, the formal verification tool 308 is a software tool that is capable of performing formal verification of a hardware design. Example formal verification tools were described above.

The copies of the hardware design 302, the test benches (each comprising a set of one or more assertions and a set of one or more constraints) 304, 306, and the bindings (if any) are loaded in the formal verification tool 308. The formal verification tool 308 is then configured to formally verify each set of one or more assertions for the hardware design. Specifically, for each sub-algebraic expression the formal verification tool 308 is configured to verify that the set of one or more assertions in the test bench 304 for that sub-algebraic expression is true for the hardware design 302; and for each combination the formal verification tool 308 is configured to verify that the set of one or more assertions in the test bench 306 for that combination is true for the hardware design 302.

When the formal verification tool 308 is used to verify an assertion, the formal verification tool 308 may output an indication of whether or not the assertion is valid (i.e. the asserted property is true for all valid states or sequence of states), which may also be referred to herein as the assertion being successfully verified. The output may be yes, the assertion is valid or has been successfully verified; no, the assertion is not valid (i.e. it is not true or has failed for at least one valid state or sequence of states) or has not been successfully verified; or the formal verification was inconclusive. The formal verification may be inconclusive, for example, because the computing-based device running the formal verification tool 308 has run out of memory or because the formal verification tool 308 has determined that a certain amount of progress has not been made after a predefined period of time.

Where an assertion is not valid or has not been successfully verified, the formal verification tool 308 may also output information indicating a state or sequence of states of the hardware design which causes the assertion to fail. For example, the formal verification tool 308 may output a trace of the verification indicating at what point, state or sequence of states the failure occurred. In other words, the formal verification tool 308 may output a counter example.

Where one or more of the verifications is performed via another verification method the system may additionally, comprise one or more other verification tools. For example, where one or more of the verifications is performed via simulation-based verification the system may comprise a simulation engine.

As is known to those of skill in the art, a simulation engine is a software tool capable of performing simulation-based verification of a hardware design. In particular, a simulation engine monitors the output of one or more instantiations of the hardware design in response to each input vector in a test set and compares the outputs to known expected outputs to determine if the instantiation is behaving as expected.

A simulation engine may perform the simulation-based verification using any known method. For example, the simulation engine may receive the hardware design in, for example HDL, convert the HDL to another language, such as C, and perform the simulation on the C code; the simulation engine may receive the hardware design as, for example, HDL and perform the simulation directly on the HDL; or the simulation engine may implement the hardware design in hardware and perform the simulation on the hardware. Once the simulation is complete the simulation engine may output an indication of whether or not the hardware design passed the simulation.

Figure 4:
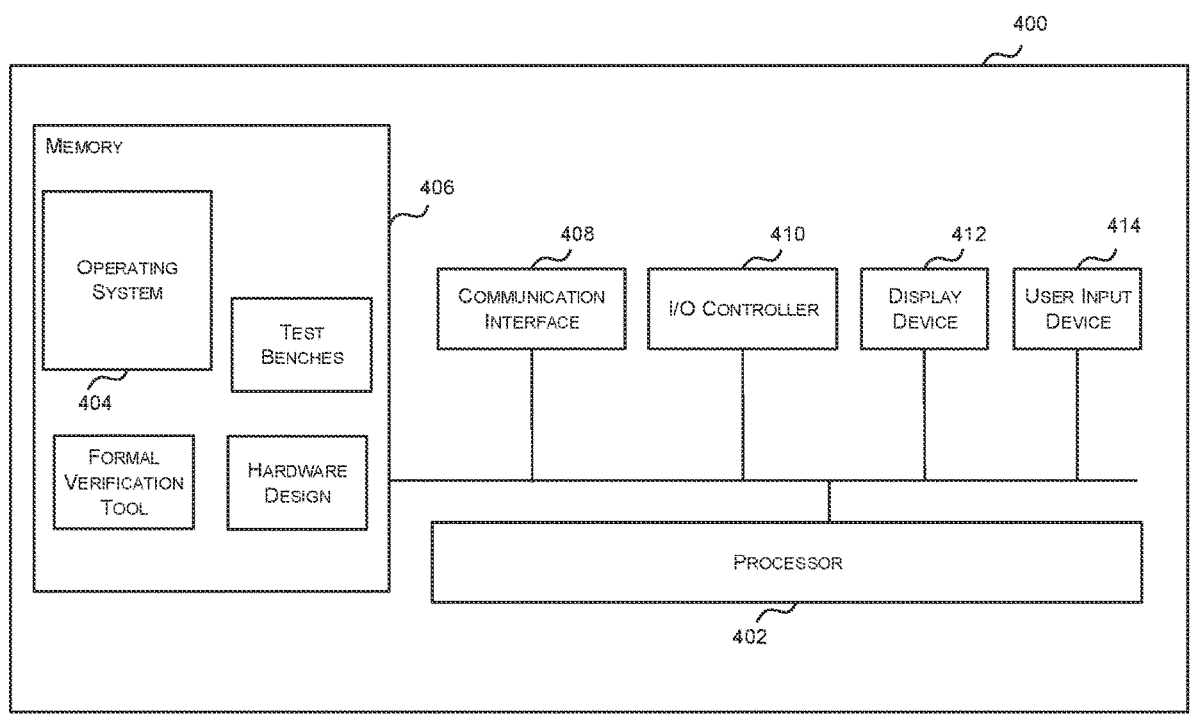
FIG. 4 is a block diagram of an example computing-based device.

FIG. 4 illustrates various components of an exemplary computing-based device 400 which may be implemented as any form of a computing and/or electronic device, and in which embodiments of the methods and systems described herein may be implemented.

Computing-based device 400 comprises one or more processors 402 which may be microprocessors, controllers or any other suitable type of processors for processing computer executable instructions to control the operation of the device in order to verify a hardware design for a component that evaluates a main algebraic expression. In some examples, for example where a system on a chip architecture is used, the processors 402 may include one or more fixed function blocks (also referred to as accelerators) which implement a part of the method of verifying a hardware design for a component that evaluates a main algebraic expression, in hardware (rather than software or firmware). Platform software comprising an operating system 404 or any other suitable platform software may be provided at the computing-based device to enable application software, such as a formal verification tool, to be executed on the device.

The computer executable instructions may be provided using any computer-readable media that is accessible by computing-based device 400. Computer-readable media may include, for example, computer storage media such as memory 406 and communications media. Computer storage media (i.e. non-transitory machine-readable media), such as memory 406, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine-readable media, e.g. memory 406) is shown within the computing-based device 400 it will be appreciated that the storage may be distributed or located remotely and accessed via a network or other communication link (e.g. using communication interface 408).

The computing-based device 400 also comprises an input/output controller 410 arranged to output display information to a display device 412 which may be separate from or integral to the computing-based device 400. The display information may provide a graphical user interface. The input/output controller 410 is also arranged to receive and process input from one or more devices, such as a user input device 414 (e.g. a mouse or a keyboard). This user input may be used to initiate verification. In an embodiment the display device 412 may also act as the user input device 414 if it is a touch sensitive display device. The input/output controller 410 may also output data to devices other than the display device, e.g. a locally connected printing device (not shown in FIG. 4).

Figure 5:
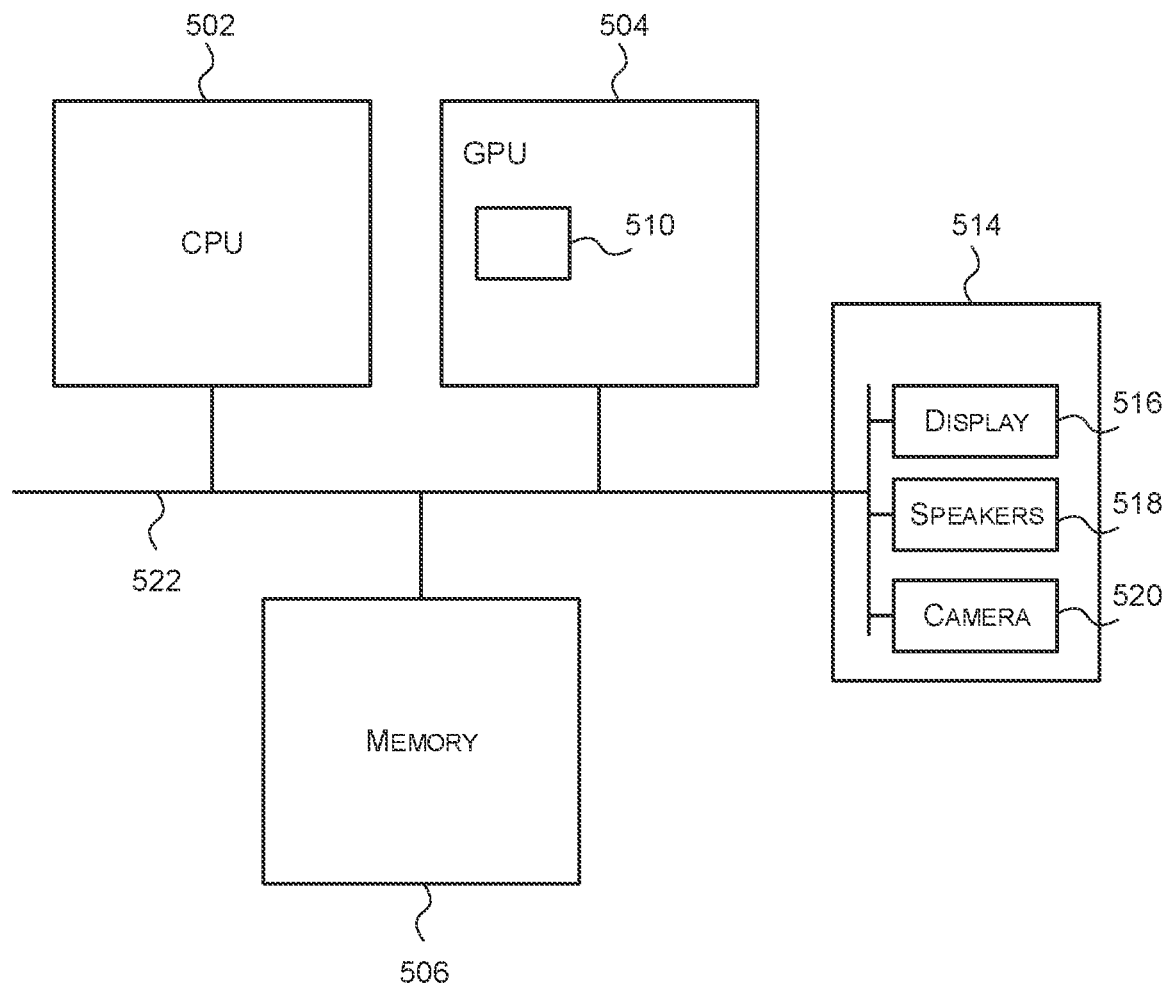
FIG. 5 is a block diagram of an example computer system in which a component that evaluates an algebraic expression described herein may be implemented.

FIG. 5 shows a computer system in which any of the components that evaluate a main algebraic expression described herein may be implemented. The computer system comprises a CPU 502, a GPU 504, a memory 506 and other devices 514, such as a display 516, speakers 518 and a camera 520. A component 510 that evaluates a main algebraic expression is implemented on the GPU 504. In other examples, component 510 may be implemented on the CPU 502. The components of the computer system can communicate with each other via a communications bus 522.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset (e.g. hardware design) that when processed (i.e. run) in an integrated circuit manufacturing system configures the system to manufacture a device (e.g. processor or other computing-based device) comprising any apparatus (e.g. component that evaluates an algebraic expression) described herein. An integrated circuit definition dataset may be, for example, an integrated circuit description.

Therefore, there may be provided a method of manufacturing, at an integrated circuit manufacturing system, a component that evaluates an algebraic expression as described herein. Furthermore, there may be provided an integrated circuit definition dataset (e.g. hardware design) that, when processed in an integrated circuit manufacturing system, causes the method of manufacturing an integrated circuit embodying the component to be performed.

An integrated circuit definition dataset (e.g. hardware design) may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset (e.g. hardware design) at an integrated circuit manufacturing system so as to configure the system to manufacture an integrated circuit embodying a component that evaluates an algebraic expression will now be described with respect to FIG. 6.

Figure 6:
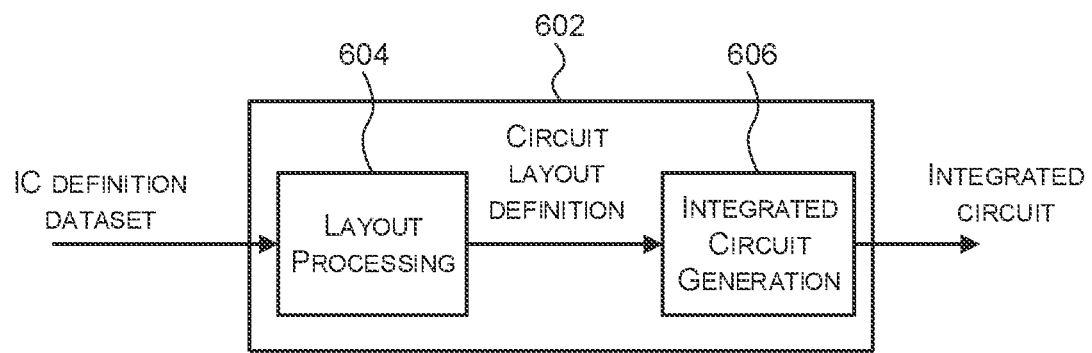
FIG. 6 is a block diagram of an example integrated circuit manufacturing system which may be used to generate an integrated circuit embodying a component that evaluates an algebraic expression described herein.

FIG. 6 shows an example of an integrated circuit (IC) manufacturing system 602 which is configured to manufacture an integrated circuit embodying a component that evaluates an algebraic expression as described in any of the examples herein. In particular, the IC manufacturing system 602 comprises a layout processing system 604 and an integrated circuit generation system 606. The IC manufacturing system 602 is configured to receive an IC definition dataset, such as a hardware design, (e.g. defining a component that evaluates an algebraic expression as described in any of the examples herein), process the IC definition dataset, and generate an IC according to the IC definition dataset (e.g. which embodies a component that evaluates an algebraic expression as described in any of the examples herein). The processing of the IC definition dataset configures the IC manufacturing system 602 to manufacture an integrated circuit embodying a component that evaluates an algebraic expression as described in any of the examples herein.

The layout processing system 604 is configured to receive and process the IC definition dataset (e.g. hardware design) to determine a circuit layout. Methods of determining a circuit layout from an IC definition dataset are known in the art, and for example may involve synthesizing RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimize the circuit layout. When the layout processing system 604 has determined the circuit layout it may output a circuit layout definition to the IC generation system 606. A circuit layout definition may be, for example, a circuit layout description.

The IC generation system 606 generates an IC according to the circuit layout definition, as is known in the art. For example, the IC generation system 606 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 606 may be in the form of computer-readable code which the IC generation system 606 can use to form a suitable mask for use in generating an IC.

The different processes performed by the IC manufacturing system 602 may be implemented all in one location, e.g. by one party. Alternatively, the IC manufacturing system 602 may be a distributed system such that some of the processes may be performed at different locations, and may be performed by different parties. For example, some of the stages of: (i) synthesizing RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an integrated circuit embodying a component that evaluates an algebraic expression without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 6 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 6, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialized fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of verifying a hardware design for a component that evaluates a main algebraic expression comprising at least two variables, the main algebraic expression being representable as a lossless combination of a plurality of sub-algebraic expressions, and one or more of the at least two variables can be constrained to cause an instantiation of the hardware design to evaluate each of the sub-algebraic expressions, the method comprising, at one or more processors:

for each of the plurality of sub-algebraic expressions, verifying that an instantiation of the hardware design generates a correct output to that sub-algebraic expression for valid values of each variable in that sub-algebraic expression; and for each of one or more combinations of sub-algebraic expressions, formally verifying that an instantiation of the hardware design generates a correct output to that combination by comparing an output of an instantiation of the hardware design under a first set of constraints to an output of an instantiation of the hardware design under a second set of constraints;

wherein the one or more combinations comprises a combination that is equivalent to the main algebraic expression.

2. The method of claim 1, wherein verifying that an instantiation of the hardware design generates a correct output to a certain sub-algebraic expression of the plurality of sub-algebraic expressions comprises, for each valid value of each variable in the certain sub-algebraic expression:

determining a first output of an instantiation of the hardware design constrained to evaluate the certain sub-algebraic expression;

determining a second output of a high-level model of the hardware design constrained to evaluate the certain sub-algebraic expression and constrained to use the same values for the variables of the certain sub-algebraic expression that were used to generate the first output; and verifying that the first output matches the second output.

3. The method of claim 1, wherein a specific sub-algebraic expression of the plurality of sub-algebraic expressions is polynomial of degree k in a variable x for all values of x in a set of values of x, and verifying that an instantiation of the hardware design generates a correct output to the specific sub-algebraic expression comprises:

formally verifying that an instantiation of the hardware design constrained to evaluate the specific sub-algebraic expression implements an expression that is polynomial of degree k in x by formally verifying that, for all values of x in the set of values of x, an instantiation of the hardware design has a constant $k^{th}$ difference; and verifying that an instantiation of the hardware design constrained to implement the specific sub-algebraic expression generates an expected output in response to each of at least e different values of x in the set of values of x, wherein e is equal to k when a value of the $k^{th}$ difference is predetermined and e is equal to k+1 when the value of the $k^{th}$ difference is not predetermined.

4. The method of claim 1, wherein the main algebraic expression is permutation invariant with respect to a particular sub-algebraic expression and a particular verified algebraic expression, and verifying that an instantiation of the hardware design generates a correct output to the particular sub-algebraic expression comprises, for all valid values of the variables of the particular verified algebraic expression:
  determining a first output of an instantiation of the hardware design constrained to evaluate the particular verified algebraic expression;
  determining a second output of an instantiation of the hardware design constrained to evaluate the particular sub-algebraic expression when the values of the variables of the particular sub-algebraic expression are the same as the values of the variables of the particular verified algebraic expression used to generate the first output; and
  verifying that the first output matches the second output.

5. The method of claim 1, wherein each combination of the one or more combinations is a combination of a first verified algebraic expression and a second verified algebraic expression, and each of the first and second verified algebraic expressions is one of: a verified sub-algebraic expression and a verified combination.

6. The method of claim 5, wherein formally verifying that an instantiation of the hardware design generates a correct output to a specific combination of the one or more combinations comprises, for valid values of each variable of the first verified algebraic expression and the second verified algebraic expression of the specific combination:
  determining a first output of an instantiation of the hardware design constrained to evaluate the first verified algebraic expression;
  determining a second output of an instantiation of the hardware design constrained to evaluate the second verified algebraic expression;
  determining a third output of an instantiation of the hardware design constrained to evaluate the specific combination, wherein the variables of the first verified algebraic expression have the same values as the variables of the first verified algebraic expression used to generate the first output, and the variables of the second verified algebraic expression have the same values as the variables of the second verified algebraic expression used to generate the second output; and
  verifying that the third output matches the combination of the first and second outputs.

7. The method of claim 5, wherein a particular combination of the one or more combinations combines the first verified algebraic expression and the second verified algebraic expression through an addition operation, and formally verifying that an instantiation of the hardware design generates a correct output to the particular combination comprises:
  formally verifying that an instantiation of the hardware design constrained to evaluate the particular combination implements an expression that is polynomial of degree k in the first verified algebraic expression by formally verifying that, for all values of the first verified algebraic expression, an instantiation of the hardware design constrained to evaluate the particular combination has a constant $k^{th}$ difference; and
  verifying that an instantiation of the hardware design constrained to evaluate the particular combination generates an expected output in response to each of at least e different values of the first verified algebraic expression, wherein e is equal to k when a value of the $k^{th}$ difference is predetermined and e is equal to k+1 when the value of the $k^{th}$ difference is not predetermined.

8. The method of claim 7, wherein formally verifying that, for all values of the first verified algebraic expression, an instantiation of the hardware design constrained to evaluate the particular combination has a constant $k^{th}$ difference comprises, during the formal verification, identifying values of the variables of the first verified algebraic expression that result in consecutive values of the first verified algebraic expression, and comparing outputs of an instantiation of the hardware design constrained to evaluate the particular combination in response to values of the variables of the first verified algebraic expression that result in consecutive values of the first verified algebraic expression.

9. The method of claim 8, wherein identifying values of the variables of the first verified algebraic expression that result in consecutive values of the first verified algebraic expression comprises:
  determining a first output of an instantiation of the hardware design constrained to evaluate the first verified algebraic expression;
  determining a second output of an instantiation of the hardware design constrained to evaluate the first verified algebraic expression when the second output is constrained to be greater than the first output by a predetermined number; and
  identifying the values of the variables of the first verified algebraic expression used to generate the first output and the values of the variables of the first verified algebraic expression used to generate the second output as values of the variables of the first verified algebraic expression that result in consecutive values of the first verified algebraic expression.

10. The method of claim 9, wherein during the formal verification the formal verification tool selects values of the variables of the first verified algebraic expression which cause the second output to be greater than the first output by the predetermined number.

11. The method of claim 9, wherein comparing outputs of an instantiation of the hardware design constrained to evaluate the particular combination in response to values of the variables of the first verified algebraic expression that result in consecutive values of the first verified algebraic expression comprises:
  determining a third output of an instantiation of the hardware design constrained to evaluate the particular combination when the values of the variables of the first verified algebraic expression match the values of the variables of the first verified algebraic expression used to generate the first output;
  determining a fourth output of an instantiation of the hardware design constrained to evaluate the particular combination when the values of the variables of the first verified algebraic expression match the values of the variables of the first verified algebraic expression used to generate the second output, and the values of any other variables to the combination match the values of those other variables used to generate the third output; and
  comparing the third output and the fourth output.

12. The method of claim 6, wherein one or more of the first, second and third outputs are generated from different copies of the hardware design.

13. The method of claim 6, wherein one or more of the first, second and third outputs are generated in a different cycle of a same copy of the hardware design.

14. The method of claim 7, wherein an output of the first verified algebraic expression is a multiple bit binary number, and formally verifying that, for all values of the first verified algebraic expression, an instantiation of the hardware design constrained to evaluate the particular combination has a constant $k^{th}$ difference comprises verifying the constant $k^{th}$ difference separately for each bit of the output of the first verified algebraic expression.

15. The method of claim 7, wherein:
an output of the first verified algebraic expression is a multiple bit binary number;
k is equal to one;
the constant $k^{th}$ difference is c; and
formally verifying that, for all values of the first verified algebraic expression, an instantiation of the hardware design constrained to evaluate the particular combination has a constant $k^{th}$ difference comprises formally verifying for each bit i of the output of the first verified algebraic expression that the difference in the outputs of an instantiation of the hardware design constrained to evaluate the particular combination in response to a first value of the first verified algebraic expression and a second value of the first verified algebraic expression is equal to $2^i*c$ wherein the $i^{th}$ least significant bit of the first value is one and the $i^{th}$ least significant bit of the second value is zero and all other bits of the first value and the second value are the same.

16. The method of claim 1, wherein a first combination of the one or more combinations combines first and second verified sub-algebraic expressions, and each combination of the one or more combinations thereafter combines a single verified sub-algebraic expression with a most recently verified combination.

17. The method of claim 1, further comprising, in response to determining that at least one of the verifications was not successful, modifying the hardware design to generate a modified hardware design.

18. The method of claim 1, further comprising, in response to determining that the verifications were successful, manufacturing, using an integrated circuit manufacturing system, an integrated circuit embodying the component according to the hardware design.

19. A system for verifying a hardware design for a component that evaluates a main algebraic expression comprising at least two variables, the main algebraic expression being representable as a lossless combination of a plurality of sub-algebraic expressions, and one or more of the at least two variables can be constrained to cause an instantiation of the hardware design to evaluate each of the sub-algebraic expressions, the system comprising:
memory configured to store:
the hardware design; and
one or more verification tools comprising one or more formal verification tools; and
one or more processors configured to:
for each of the plurality of sub-algebraic expressions, verify, using the one or more verification tools, that an instantiation of the hardware design generates a correct output to that sub-algebraic expression for valid values of each variable in that sub-algebraic expression; and
for each of one of more combinations of sub-algebraic expressions, formally verify, using the one or more formal verification tools, that an instantiation of the hardware design generates a correct output to that combination of sub-algebraic expressions by comparing an output of an instantiation of the hardware design under a first set of constraints to an output of an instantiation of the hardware design under a second set of constraints;
wherein the one or more combinations comprises a combination that is equivalent to the main algebraic expression.

20. A non-transitory computer readable storage medium having stored thereon computer readable instructions that, when executed at a computer system, cause the computer system to perform the method as set forth in claim 1.

* * * * *